US010296142B2

(12) United States Patent
Yoshimura et al.

(10) Patent No.: US 10,296,142 B2
(45) Date of Patent: May 21, 2019

(54) INFORMATION DISPLAY DEVICE, SYSTEM, AND RECORDING MEDIUM

(71) Applicants: Yuuichi Yoshimura, Kanagawa (JP); Shun Yokota, Kanagawa (JP)

(72) Inventors: Yuuichi Yoshimura, Kanagawa (JP); Shun Yokota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 15/381,872

(22) Filed: Dec. 16, 2016

(65) Prior Publication Data

US 2017/0177151 A1 Jun. 22, 2017

(30) Foreign Application Priority Data

Dec. 22, 2015 (JP) ................................ 2015-249750
Apr. 28, 2016 (JP) ................................ 2016-090186
Jun. 10, 2016 (JP) ................................ 2016-116258

(51) Int. Cl.
*G06F 3/042* (2006.01)
*G06F 3/041* (2006.01)
*G06F 3/0354* (2013.01)

(52) U.S. Cl.
CPC .......... *G06F 3/042* (2013.01); *G06F 3/03545* (2013.01); *G06F 3/0416* (2013.01); *G06F 2203/04104* (2013.01)

(58) Field of Classification Search
CPC ..................... G06F 3/011; G06F 3/017; G06F 3/042–3/0428; G06F 2203/04104; G06F 2203/04808
See application file for complete search history.

(56) References Cited

U.S. PATENT DOCUMENTS 6,421,042 B1 7/2002 Omura et al.
8,390,578 B2 3/2013 Chino
9,189,086 B2 * 11/2015 McGibney .......... G06F 3/03545
9,465,480 B2 * 10/2016 Ichieda ................. G06F 3/0425
(Continued)

FOREIGN PATENT DOCUMENTS

JP 2000-132340 5/2000
JP 2002-342015 11/2002
(Continued)

*Primary Examiner* — Gene W Lee
(74) *Attorney, Agent, or Firm* — Oblon, McClelland, Maier & Neustadt, L.L.P.

(57) ABSTRACT

The information display device includes a display unit configured to display information; an irradiating unit configured to irradiate the display unit with light; at least one imaging unit configured to capture an image on the display unit; a controller configured to cause the irradiating unit to alternately switch irradiation and non-irradiation; a medium identifying unit configured to identify a first input medium that emits light and a second input medium that does not emit the light, used for inputting additional information to be added to the information, in accordance with images successively captured by the at least one imaging unit, by the controller causing the irradiating unit to alternately switch the irradiation and the non-irradiation; and a position detector configured to detect positions of the first input medium and the second input medium on the display unit in accordance with the images successively captured.

14 Claims, 28 Drawing Sheets

(56) References Cited

U.S. PATENT DOCUMENTS

| | | | | |
|---|---|---|---|---|
| 2003/0020688 | A1* | 1/2003 | Norskog | G06F 1/32 345/158 |
| 2008/0254822 | A1* | 10/2008 | Tilley | G06F 1/1626 455/550.1 |
| 2013/0036320 | A1 | 2/2013 | Yoshimura | |
| 2018/0074654 | A1* | 3/2018 | Tanaka | G06F 3/0425 |

FOREIGN PATENT DOCUMENTS

| | | |
|---|---|---|
| JP | 2008-217819 | 9/2008 |
| JP | 4775386 | 9/2011 |
| JP | 5307108 | 10/2013 |

* cited by examiner

INFORMATION DISPLAY DEVICE, SYSTEM, AND RECORDING MEDIUM

CROSS-REFERENCE TO RELATED APPLICATIONS

The present application claims the benefit of priority under 35 U.S.C. § 119 of Japanese Patent Application No. 2015-249750 filed on Dec. 22, 2015, Japanese Patent Application No. 2016-090186 filed on Apr. 28, 2016, and Japanese Patent Application No. 2016-116258 filed on Jun. 10, 2016, the entire contents of which are incorporated herein by reference.

BACKGROUND OF THE INVENTION

1. Field of the Invention

The disclosures herein generally relate to an information display device, a system, and a non-transitory recording medium storing a program for causing a computer to execute processing of identifying an input medium and detecting a position of the input medium.

2. Description of the Related Art

Electronic whiteboard systems are being introduced in offices and schools. In such an electronic whiteboard system, by using a pen and a finger, information is input on a screen that displays images. In the electronic whiteboard system, images of the pen and the finger are captured by cameras, and the positions of the pen and the finger are detected in the captured images, as disclosed in, for example, Japanese Unexamined Patent Application Publication No. 2000-132340.

SUMMARY OF THE INVENTION

In one embodiment, an information display device displaying information is provided. The information display device includes a display unit configured to display the information; an irradiating unit configured to irradiate the display unit with light; at least one imaging unit configured to capture an image on the display unit; a controller configured to cause an irradiating unit to alternately switch irradiation and non-irradiation; a medium identifying unit configured to identify a first input medium that emits light and a second input medium that does not emit the light in accordance with images successively captured by the at least one imaging unit, by the controller causing the irradiating unit to alternately switch the irradiation and the non-irradiation, the first input medium and the second input medium being used for inputting additional information to be added to the information; and a position detector configured to detect positions of the first input medium and the second input medium on the display unit in accordance with the images successively captured by the at least one imaging unit, the first input medium and the second input medium having been identified by the medium identifying unit.

DESCRIPTION OF THE PREFERRED EMBODIMENTS

In the following, embodiments of the present invention will be described with reference to the accompanying drawings.

Figure 1:
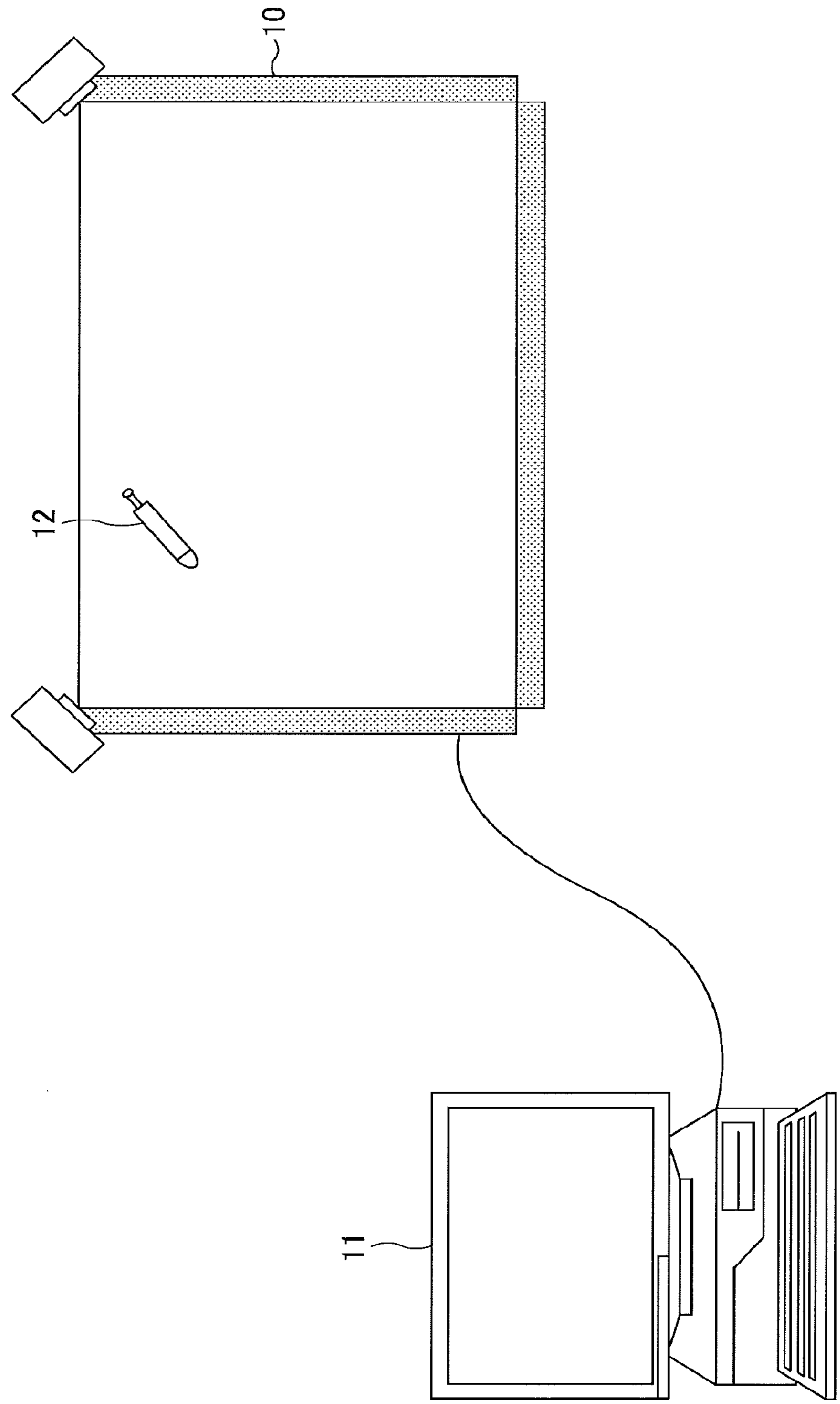
FIG. 1 is a view of a general arrangement of an information display system.

FIG. 1 is a view of a general arrangement of an information display system. The information display system includes an electronic whiteboard 10. The electronic whiteboard 10 serves as an information display device that is configured to display information, to receive inputs of additional information to be added to the displayed information, to combine the displayed information with the added information, and to display the combined information. The information display system may include a Personal Computer (PC) 11 and an electronic pen 12. The PC 11 serves as an information processing device that is configured to transmit information to be displayed on the electronic whiteboard 10. The electronic pen 12 serves as an input medium used for inputting the above-described additional information.

The electronic whiteboard 10 includes a display unit configured to display information, and to display the information transmitted from the PC 11. The display unit is a display, for example. The information transmitted from the PC 11 includes, for example, an image displayed on the screen of the PC 11. In order to acquire the information from the PC 11, the electronic whiteboard 10 may be coupled to the PC 11 by a cable or by wireless communication in a wireless Local Area Network (LAN) such as Wi-Fi. The electronic whiteboard 10 detects an input medium on the display such as the electronic pen 12, a finger, and any similar thing, identifies the input medium, and detects the position of the input medium.

Hence, the electronic whiteboard 10 includes an irradiating unit that irradiates the display with light, and at least one imaging unit configured to capture an image on the display. To capture an image of the electronic pen 12, the irradiating unit stops irradiating light (turns off the light), so that the at least one imaging unit captures an image of the electronic pen 12 that emits light. The electronic whiteboard 10 detects the position, from which the light is emitted, as the position of the electronic pen 12, in accordance with the captured image.

To capture an image of the finger or any similar thing, the irradiating unit irradiates light (turns on the light), so that the at least one imaging unit captures an image of a shadow formed by blocking the light with the finger or any similar thing. The electronic whiteboard 10 detects the position of the shadow as the position of the finger or any similar thing, in accordance with the captured image.

One imaging unit may be provided in a case where such one imaging unit is arranged to oppose the front face of the display screen. Such one imaging unit is capable of detecting the electronic pen 12, the finger, or any similar thing in two-dimensional coordinates with a predetermined position being the reference coordinates (0,0). Alternatively, at least two imaging units are arranged at corners of the screen having a rectangular shape, so that the positions of the electronic pen 12, the finger, or any similar thing may be calculated in a triangulation method.

In the triangulation method, the two imaging units that are arranged at predetermined positions are set to two ends. The line connecting the two ends is set to be the baseline. Angles from the two imaging units toward the electronic pen 12 with respect to the baseline are measured, and the position of the electronic pen 12, a finger, or any similar thing is determined from the angles that have been measured. Three or four imaging units that are arranged at three or four corners of the screen enable the position detection with higher certainty, when a first side of the electronic pen 12 or a finger is hidden by a hand, the image of the emitted light or the shadow will be captured from a second side.

The imaging unit includes an imaging element. The imaging element scans a subject to be imaged and captures an image at a certain imaging rate. The electronic whiteboard 10 continuously detects the position of the electronic pen 12, the finger, or any similar thing, while the imaging unit is capturing the image of the light emitted from the electronic pen 12 or the shadow of the finger or any similar thing. The electronic whiteboard 10 connects the detected positions to form a line, and thus creates additional information such as a character or a drawing with the line. The electronic whiteboard 10 combines the additional information that has been created with the image displayed on the screen at a corresponding timing, and then displays the combined image. The electronic whiteboard 10 is capable of transmitting the combined image to the PC 11 to display the combined image on the PC 11.

Figure 2:
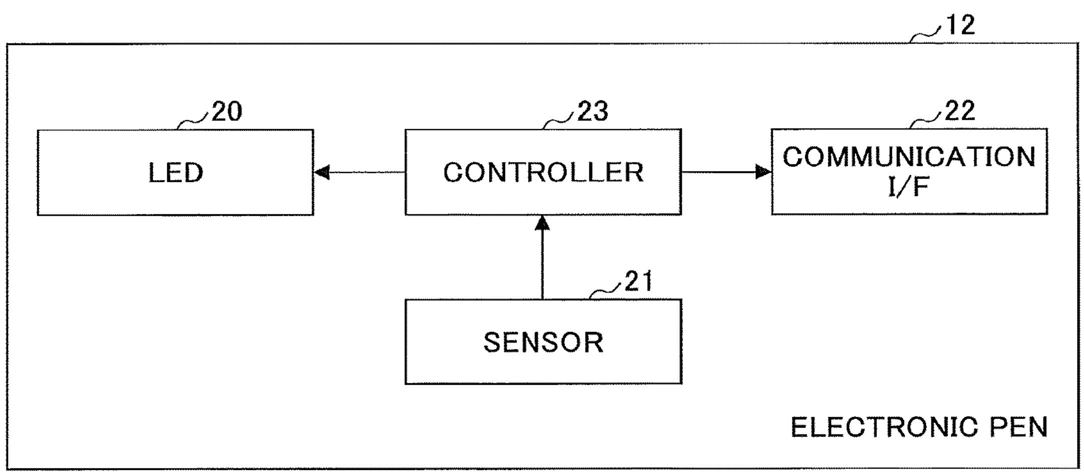
FIG. 2 is a view of a hardware configuration of an electronic pen included in the information display system.

Referring to FIG. 2, the hardware configuration of the electronic pen 12 will be described briefly. The electronic pen 12 includes a Light-Emitting Diode (LED) 20 that emits infrared light (i.e., visible light), a sensor 21 that detects a touch on the display screen, a communication I/F 22 that transmits wireless signals, and a controller 23. The controller 23 is configured to control the LED 20, the sensor 21, and the communication I/F 22.

The electronic pen 12 is used for selecting the menu displayed on the display screen or inputting information including a character and a drawing. The sensor 21 is arranged at a tip portion of the electronic pen 12, and detects a pressure applied onto the tip portion to detect a touch on the display screen. This is merely an example in detecting a touch, and another method for detecting a touch may be applicable. After the sensor 21 detects the touch, the controller 23 turns on the LED 20 and transmits a wireless signal through the communication I/F 22. The wireless signal is a signal to report that the electronic pen 12 has touched the display screen. Additionally, a signal to report that the electronic pen 12 has been separated (i.e., detached) from the display screen can be transmitted as a wireless signal.

The electronic pen 12 may include a memory, although the memory is not illustrated in FIG. 2. In the memory, attribute information such as identification (ID) data unique for the memory can be stored. Such ID data may be included and transmitted in a wireless signal. The ID data transmitted as described above makes each of a plurality of electronic pens 12 identifiable, in a case where the plurality of electronic pens 12 are used for inputting information.

The LED 20 is always emitting light, while the pen is touching the display screen. However, an acceleration sensor or another sensor that enables estimation of the using state of the user may be embedded in the electronic pen 12. Whether the user is moving the electronic pen 12 is determined by an output from the sensor. The LED 20 may be turned off, when the user does not move the electronic pen 12. The LED 20 can be turned off as needed, depending on the using state as described above. This configuration prolongs the service life of the battery installed in the electronic pen 12.

Figure 3:
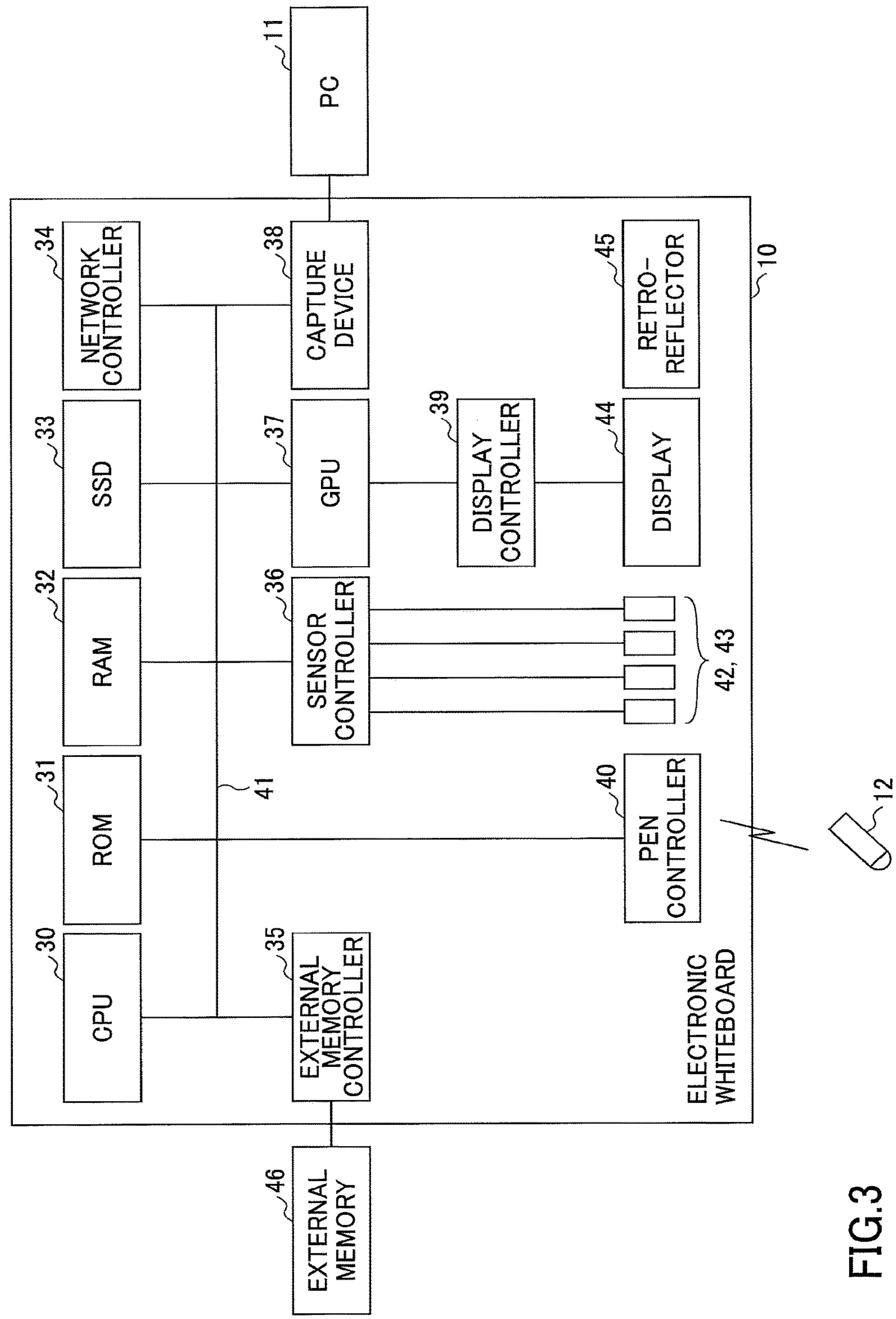
FIG. 3 is a view of a hardware configuration of an electronic whiteboard serving as an information display device included in the information display system.

Referring to FIG. 3, the hardware configuration of the electronic whiteboard 10 will be described. The electronic whiteboard 10 includes a Central Processing Unit (CPU) 30, a Read Only Memory (ROM) 31, a Random Access Memory (RAM) 32, and a Solid State Drive (SSD) 33. The electronic whiteboard 10 also includes a network controller 34, an external memory controller 35, a sensor controller 36, a Graphics Processor Unit (GPU) 37, and a capture device 38. The electronic whiteboard 10 also includes a display controller 39 and a pen controller 40. The above-described units are coupled to one another by a bus 41.

The electronic whiteboard 10 also includes an LED 42, a camera 43, and a display 44. The LED 42 serves as the irradiating unit to be coupled to the sensor controller 36. The camera 43 serves as the at least one imaging unit. The display 44 serves as the display screen coupled to the display controller 39. The electronic whiteboard 10 also includes a retroreflector 45 that reflects to the LED 42 the light emitted from the LED 42.

The CPU 30 controls the overall electronic whiteboard 10, and carries out a program for detecting the electronic pen 12, a finger, and any similar thing, and detecting the positions of the electronic pen 12, the finger, and any similar thing. In the ROM 31, software such as a boot program and firmware to boot the electronic whiteboard 10 is stored. The RAM 32 is a work area of the CPU 30. In the SSD 33, the OS, the above-described programs, and setting data are stored. In one embodiment, an SSD is a non-limiting example, but a Hard Disk Drive (HDD) may be used.

The network controller 34 performs a process in accordance with communication protocols such as TCP/IP, when the electronic whiteboard 10 communicates with a server via networks. Examples of the networks may include, but are not limited to, a Local Area Network (LAN), a Wide Area Network (WAN) in which a plurality of LANs are connected, and the Internet.

The external memory controller 35 writes into and reads from an external memory 46 that is detachable. Examples of the external memory 46 may include, but are not limited to, a Universal Serial Bus (USB) memory and a Secure Digital (SD) memory card. The capture device 38 is a device that captures information, for example, an image displayed on the PC 11. The GPU 37 is a processor dedicated for drawing, and calculates the pixel value of each pixel of the display 44. The display controller 39 outputs the image drawn by the GPU 37 to the display 44.

The sensor controller 36 is coupled to the LED 42 and the camera 43. The sensor controller 36 is configured to causes the LED 42 to turn on and off, and to receive an input of an image from the camera 43. The CPU 30 detects the positions of the electronic pen 12, a finger, any any similar thing on the display 44 in the triangulation method, in accordance with the image received by the sensor controller 36. The pen controller 40 communicates by wireless with the electronic pen 12, and receives the above-described wireless signals from the electronic pen 12. This configuration enables the electronic whiteboard 10 to detect whether the electronic pen 12 has touched the display 44. This configuration also enables determining which pen has touched the display 44, when the ID data is included in a wireless signal.

In detecting the position of the electronic pen 12, the finger, or a similar thing in the triangulation method, at least two cameras 43 are provided. The cameras 43 are arranged to capture images in a little upper part of the display 44. The retroreflector 45 is arranged to surround the display 44. The LEDs 42 that are arranged are same in number as the cameras 43, such that the LEDs 42 are respectively arranged adjacently to the cameras 43.

In the case where two cameras 43 are arranged at two corners of the display 44, three retroreflectors 45 are arranged adjacently or proximately on three sides of the display 44, except for one side where the two cameras 43 are arranged at the corners. This configuration aims to reflect the light emitted from the LEDs 42 respectively arranged adjacently to the two cameras 43, and to return the light to the LEDs 42.

The above-described program that runs on the CPU 30 may be recorded in the external memory 46 and then may be distributed, or may be downloaded from a server, not illustrated, through the network controller 34. Alternatively, the above-described program may be downloaded in a compressed state or in an executable state.

In FIG. 3, in one embodiment, the network controller 34 and the external memory controller 35 are provided. However, the network controller 34 and the external memory controller 35 are not necessarily provided, and may be provided as needed.

The PC 11 holds information to be displayed on the electronic whiteboard 10, and transmits the information to the electronic whiteboard 10. The PC 11 has the same configuration as the configuration of a commonly used PC, which includes a CPU, a ROM, a RAM, a HDD or SSD, a communication I/F, an input and output I/F, an input device such as a mouse and a keyboard, and a display device such as a display. The above-described hardware included in the PC 11 is known and the descriptions are omitted here.

Figure 4A:
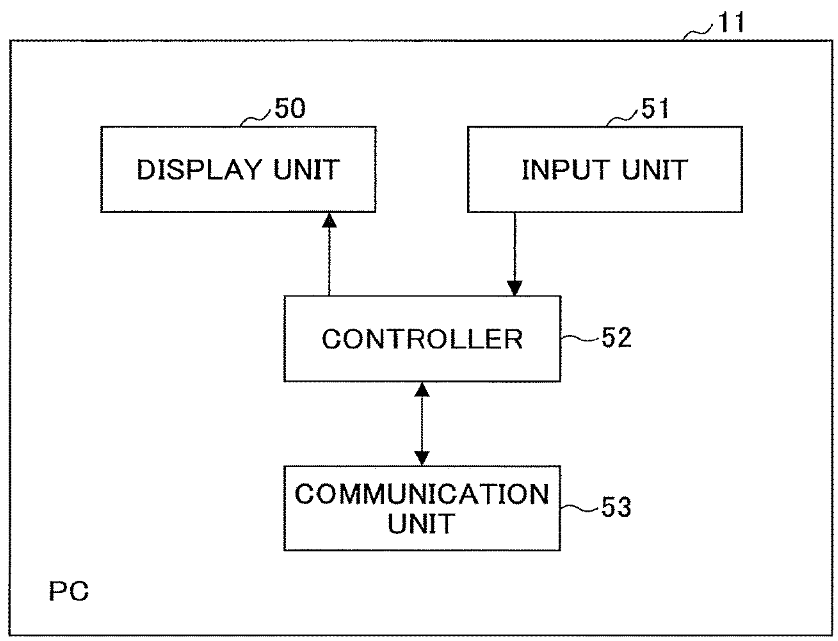
FIG. 4A is a functional block diagram of a PC.
Figure 4B:
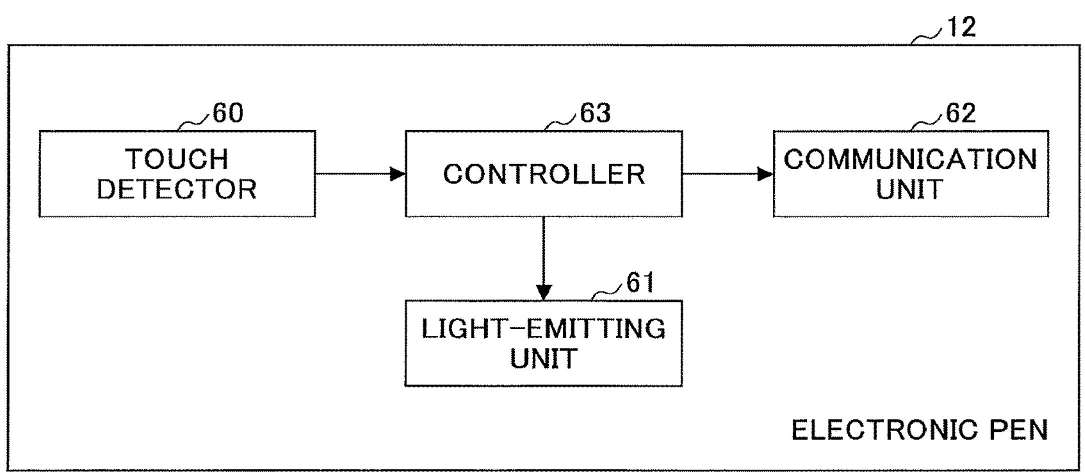
FIG. 4B is a functional block diagram of the electronic pen.

Referring to FIG. 4A and FIG. 4B, functional configurations of the PC 11 and the electronic pen 12 will be described briefly. As illustrated in FIG. 4A, the PC 11 includes a display unit 50 that displays the image to be displayed on the electronic whiteboard 10, and an input unit 51 that receives an input such as an image selection or a display instruction for the electronic whiteboard 10. The PC 11 also includes a controller 52 and a communication unit 53. The controller 52 controls displaying of an image on the display unit 50 and transmitting of the image to the electronic whiteboard 10. The communication unit 53 serves as a transmitter and a receiver configured to transmit the image and to receive the combined image in which the image is combined with the information that has been input. The above-described functional units are enabled by the CPU of the PC 11 running a program stored in a device such as the HDD.

As illustrated in FIG. 4B, the electronic pen 12 includes a touch detector 60, a light-emitting unit 61, and a communication unit 62. The touch detector 60 detects a touch on the display screen. The light-emitting unit 61 causes the electronic pen 12 to emit light. The communication unit 62 transmits wireless signals to the electronic whiteboard 10. The electronic pen 12 also includes a controller 63. After the touch detector 60 detects a touch, the controller 63 instructs the light-emitting unit 61 to emit light and instructs the communication unit 62 to transmit a wireless signal. The communication unit 62 serves as a communication unit and reports the touch to the display screen by a wireless signal. The above-described functional units are enabled by the LED 20, the sensor 21, and the controller 23 included in the electronic pen 12.

Figure 5:
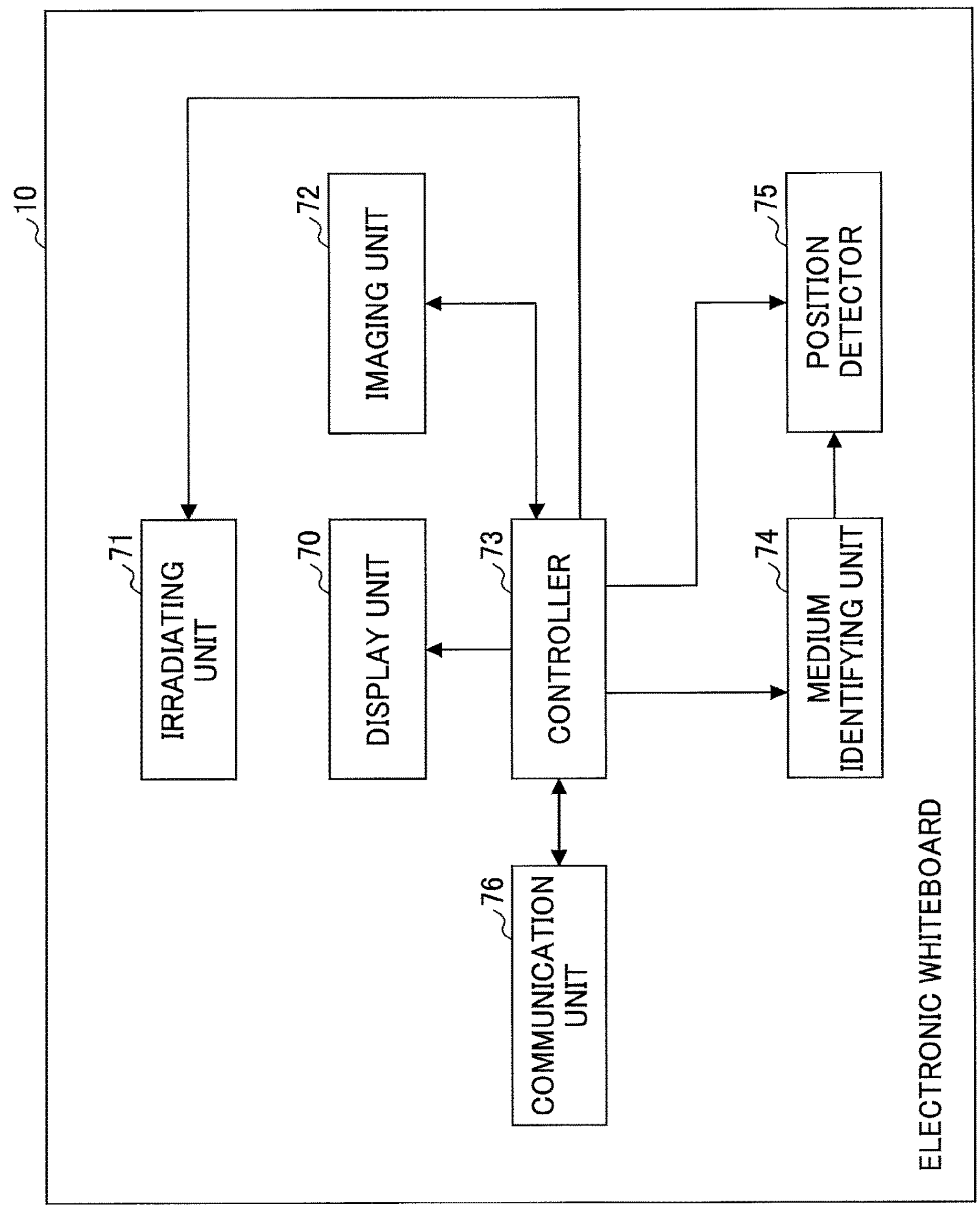
FIG. 5 is a functional block diagram of the electronic whiteboard.

Referring to FIG. 5, a functional configuration of the electronic whiteboard 10 will be described. The electronic whiteboard 10 includes a display unit 70, an irradiating unit 71, an imaging unit 72, a controller 73, a medium identifying unit 74, a position detector 75, and a communication unit 76. The communication unit 76 includes a receiver and a transmitter. The receiver receives an image as the information from the PC 11 and wireless signals from the electronic pen 12. The transmitter transmits the combined image to the PC 11. The above-described functional units are enabled by the LED 42, the camera 43, the display 44, and the CPU 30 running the above-described program.

The display unit 70 displays an image transmitted from the PC 11, and displays a combined image in which the image that has been transmitted is combined with the information that has been input. The irradiating unit 71 functions as lighting that irradiates the display unit 70 with light. At least one imaging unit 72 is provided to capture an image on the display unit 70. To be specific, when the electronic pen 12 exists on the display unit 70, the imaging unit 72 captures the light emitted from the electronic pen 12. When a finger or any similar thing exists on the display unit 70, the imaging unit 72 captures an image of the shadow of the finger or any similar thing.

The controller 73 sets timings of switching on and off the light irradiated from the irradiating unit 71 so as to cause the irradiating unit 71 to switch the lighting on and off. In the imaging rate (i.e., recognition rate) of the imaging unit 72 set to 120 fps, the imaging element of the imaging unit 72 scans 120 images per second, and then the imaging unit 72 outputs image data. With the use of 60 images, the controller 73 identifies the electronic pen 12 and detects the position of the electronic pen 12. With the use of 60 images, the controller 73 recognizes a finger or any similar thing and detects the position of the finger or any similar thing. Therefore, whenever the imaging unit 72 captures one image, the controller 73 is capable of switching the lighting on and off.

In order to switch the lighting on and off whenever the imaging unit 72 captures one image, the controller 73 controls the lighting so that the pen recognition rate of recognizing the electronic pen 12 can be 60 fps and the finger recognition rate of recognizing a finger or any similar thing can be 60 fps. The above-described recognition rates can be stored as default values in a table. Such default values can be read out in an initialization process, and then can be set. In the above-described table, values for changing the recognition rates are also stored. When a change is needed, the value for changing the recognition rate can be read out, and then can be set. The value for changing the recognition can be read out from the table, and then the pen recognition rate can be set to 80 fps and the finger recognition rate can be set to 40 fps. When the recognition rates are changed as described above, the lighting on and off is switched to repeat a process of turning off the lighting to capture two images and turning on the lighting to capture one image.

The medium identifying unit 74 identifies the electronic pen 12 that emits light and a finger or any similar thing that does not emit light, in at least one image that has been captured. The medium identifying unit 74 identifies the electronic pen 12 that emits light in receiving a wireless signal from the electronic pen 12. The medium identifying unit 74 identifies an input medium such as a finger or any similar thing that does not emit light in an image captured when the lighting is on. It is to be noted that the electronic pen 12 may be identified in an image captured when the lighting is off. In the above-described identifying method, when both the electronic pen 12 and a finger exist on the display unit 70, the electronic pen 12 and the finger are distinguished from each other and are individually identifiable.

The position detector 75 detects the position of the electronic pen 12 on the display unit 70 and the position of the finger or any similar thing on the display unit 70, in at least one image that has been captured, after the electronic pen 12 and the finger or any similar thing are identified. The position detector 75 detects the position of the electronic pen 12 in the above-described triangulation method, for example, in accordance with the image captured when the lighting is off. The position detector 75 detects the position of the finger or any similar thing in the above-described triangulation method, for example, in accordance with the image captured when the lighting is on.

Figure 6A:
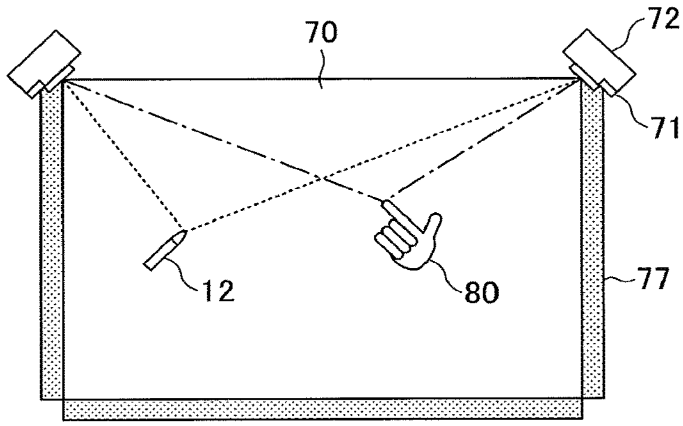
FIG. 6A to FIG. 6C illustrate a method for identifying both the electronic pen and the finger and detecting positions of the electronic pen and the finger.
Figure 6B:
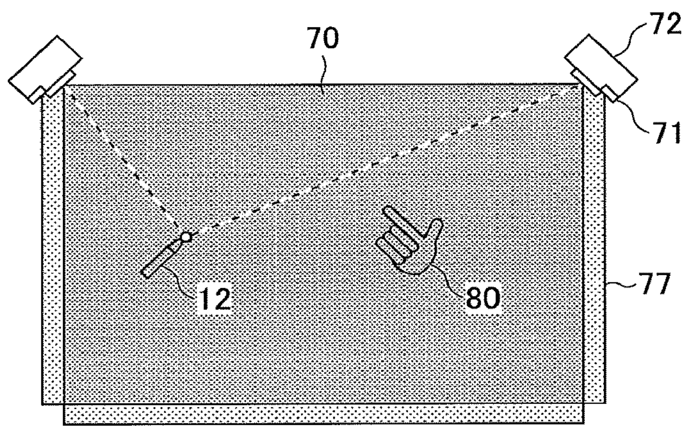
Figure 6C:
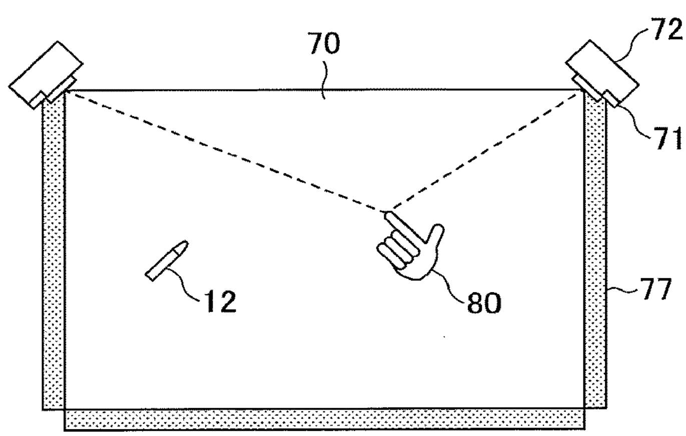

Referring to FIG. 6A to FIG. 6C, a method for identifying both an electronic pen 12 and a finger 80 and detecting the positions of the electronic pen 12 and the finger 80 will be described. In FIG. 6A, both the electronic pen 12 and the finger 80 exist on the display unit 70 of the electronic whiteboard 10. By using both the electronic pen 12 and the finger 80, inputting of the additional information has started. Herein, the electronic whiteboard 10 includes two imaging units 72 arranged at respective two corners on the top side of the rectangular display unit 70, and two irradiating units 71 respectively arranged adjacently or proximately to the two imaging units 72. The electronic whiteboard 10 also includes a retroreflector 77, which is enabled by retroreflectors arranged adjacently or proximately to three sides, except for the top side where the two imaging units 72 are arranged.

The irradiating unit 71 alternately turns on the lighting as illustrated in FIG. 6B and turns off the lighting as illustrated in FIG. 6C. The imaging unit 72 captures images of both cases. Referring to FIG. 6B, the electronic pen 12 emits light when touching the display unit 70, and the imaging unit 72 captures an image of the emitted light. At this timing, the imaging unit 72 also captures the image of the finger 80, but the finger 80 cannot be seen in the image because the lighting is off. Only the position of the electronic pen 12 is detected in the captured image.

Referring to FIG. 6C, the electronic pen 12 touches the display unit 70 and thus emits light. However, the lighting that has been turned on makes difficult the detection of the emitted light from the electronic pen 12. On the other hand, the lighting makes a shadow of the finger 80. The imaging unit 72 captures an image of the shadow. The electronic pen 12 also has a shadow, but while the electronic pen 12 is emitting light, the shadow is faint. For this reason, the position of the finger 80 is detected in the captured image.

As described above, alternately switching the lighting on and off at high rate enables the identification of both the electronic pen 12 and the finger 80, and also enables detection of both of the positions, when both the electronic pen 12 and the finger 80 exist on the display unit 70.

In order to enhance the accuracy in detecting the position of the electronic pen 12, the position of the electronic pen 12 should be detected more frequently. For this purpose, the pen recognition rate is increased and the finger recognition rate is decreased, so that the non-lighting period is made longer and the lighting period is made shorter. On the other hand, in order to enhance the accuracy in detecting the position of the finger 80, the finger recognition rate is increased and the pen recognition rate is decreased.

A process of identifying the electronic pen 12 and the finger 80, to be performed by the electronic whiteboard 10 illustrated in FIG. 5, will be described in detail with reference to FIG. 7. This process starts from step S700. Before the process starts, settings on the recognition rate of the imaging unit 72 have been completed. It is assumed that the recognition rate is set to 120 fps.

In step S705, the controller 73 controls the lighting such that the pen recognition rate is 60 fps and the finger recognition rate is 60 fps. To be specific, the controller 73 causes the irradiating unit 71 to switch the lighting on and off whenever the imaging unit 72 captures one image.

In step S710, the medium identifying unit 74 determines whether the electronic pen 12 has touched the display unit 70. This determination is based on whether the communication unit 76 has received a wireless signal. When the electronic pen 12 does not touch the display unit 70, the process goes to step S715. When the electronic pen 12 touches the display unit 70, the process goes to step S720.

In step S715, the medium identifying unit 74 determines whether a finger has touched the display unit 70. The touch of the finger is determined by detecting the shadow of the finger in the captured image. When the finger does not touch the display unit 70, the process returns to step S710. When the finger touches the display unit 70, the process goes to step S730.

In step S720, when only the electronic pen 12 touches the display unit 70, the controller 73 refers to the table and changes the pen recognition rate to 100 fps and the finger recognition rate to 20 fps, so as to change the timings of switching the lighting on and off. Such changes aim to enhance the accuracy in detecting the position of the electronic pen 12. In step S725, the medium identifying unit 74 identifies the electronic pen 12, and determines whether a finger has touched the display unit 70 while the medium identifying unit 74 is continuously detecting the touch of the electronic pen 12. When the medium identifying unit 74 does not detect that the finger touches the display unit 70, the recognition rate that was changed in step S720 is maintained and the process of step S725 is repeated.

When the medium identifying unit 74 detects that the finger touches the display unit 70 in step S725, the process goes to step S740. In step S740, the controller 73 changes both the pen recognition rate and the finger recognition rate to 60 fps, so as to change the timings of switching the lighting on and off, in a similar manner to step S705. Such changes aim to detect the electronic pen 12 and the finger equally, and to detect the positions of the electronic pen 12 and the finger.

In step S730, when only the finger touches the display unit 70, the controller 73 refers to the table and changes the finger recognition rate to 100 fps and the pen recognition rate to 20 fps, so as to change the timings of switching the lighting on and off. In step S735, while continuously detecting the touch of the finger, the medium identifying unit 74 determines whether the electronic pen 12 has touched the display unit 70. When the medium identifying unit 74 does not detect that the electronic pen 12 touches the display unit 70, the recognition rate that was changed in step S730 is maintained and the process of step S735 is repeated.

When the medium identifying unit 74 detects that the electronic pen 12 touches the display unit 70 in step S725, the process goes to step S740. The controller 73 changes both the pen recognition rate and the finger recognition rate to 60 fps, in a similar manner to step S705. Then, in step S745, the process of identifying both the electronic pen 12 and the finger ends.

After both the electronic pen 12 and the finger are identified, the position detector 75 continuously detects the positions of both the electronic pen 12 and the finger, while the medium identifying unit 74 is detecting touches of both the electronic pen 12 and the finger. By using the information on the positions that have been detected as described above, the additional information such as a character or a drawing is created. The additional information that has been created is combined with the image displayed on the display unit 70, and the combined image is then displayed on the display unit 70. The electronic whiteboard 10 can further include a creator configured to create the additional information, and a combining unit configured to combine the additional information with the image.

When any one of the electronic pen 12 and the finger ends inputting, to be specific, when the electronic pen 12 ends inputting, the communication unit 76 does not receive a wireless signal. When the finger ends inputting, the shadow of the finger does not exist in the image captured by the imaging unit 72. In this case, the medium identifying unit 74 identifies any one of the electronic pen 12 and the finger, and does not identify the other one, because the other one does not exist. This configuration allows the position detector 75 to detect the position of only one of the input media, whichever has been identified by the medium identifying unit 74, to create the additional information by using the position information, and to display the combined image.

When only the electronic pen 12 touches the display unit 70, the pen recognition rate is changed to 100 fps and the finger recognition rate is changed to 20 fps, in step S720. On the other hand, when only the finger touches the display unit 70, the finger recognition rate is changed to 100 fps and the pen recognition rate is changed to 20 fps, in step S730. This configuration enhances the accuracy in detecting the position of the electronic pen 12 or the finger.

However, when touch and detach are repeated in a short period, for example, when a dotted line is drawn, the recognition rate has to be changed in a short period. This may complicate the process. Besides, unless the recognition rate is changed appropriately, the line may be broken or lost. This makes it impossible to understand what kind of drawing or character is being written. Hence, in a case where a certain period has passed since no touch is detected, and still no touch is detected, the recognition rates are changed to prevent such a broken line or a lost line. Examples of the certain period may include, but are not limited to, five seconds.

When both the electronic pen 12 and the finger end inputting, both the pen recognition rate and the finger recognition rate are changed to 60 fps in a similar manner to step S705. This state is maintained until a touch of an input medium is detected again. Then, the process from the step S710 is performed.

Figure 8:
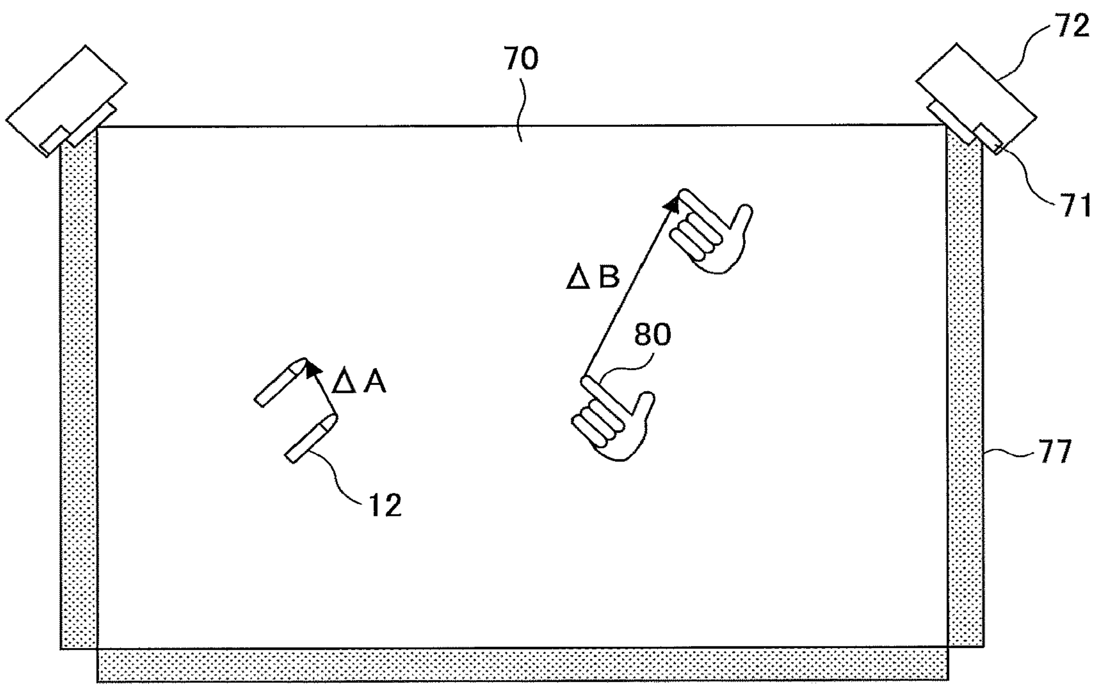
FIG. 8 illustrates moved amounts of the electronic pen and the finger.
Figure 9:
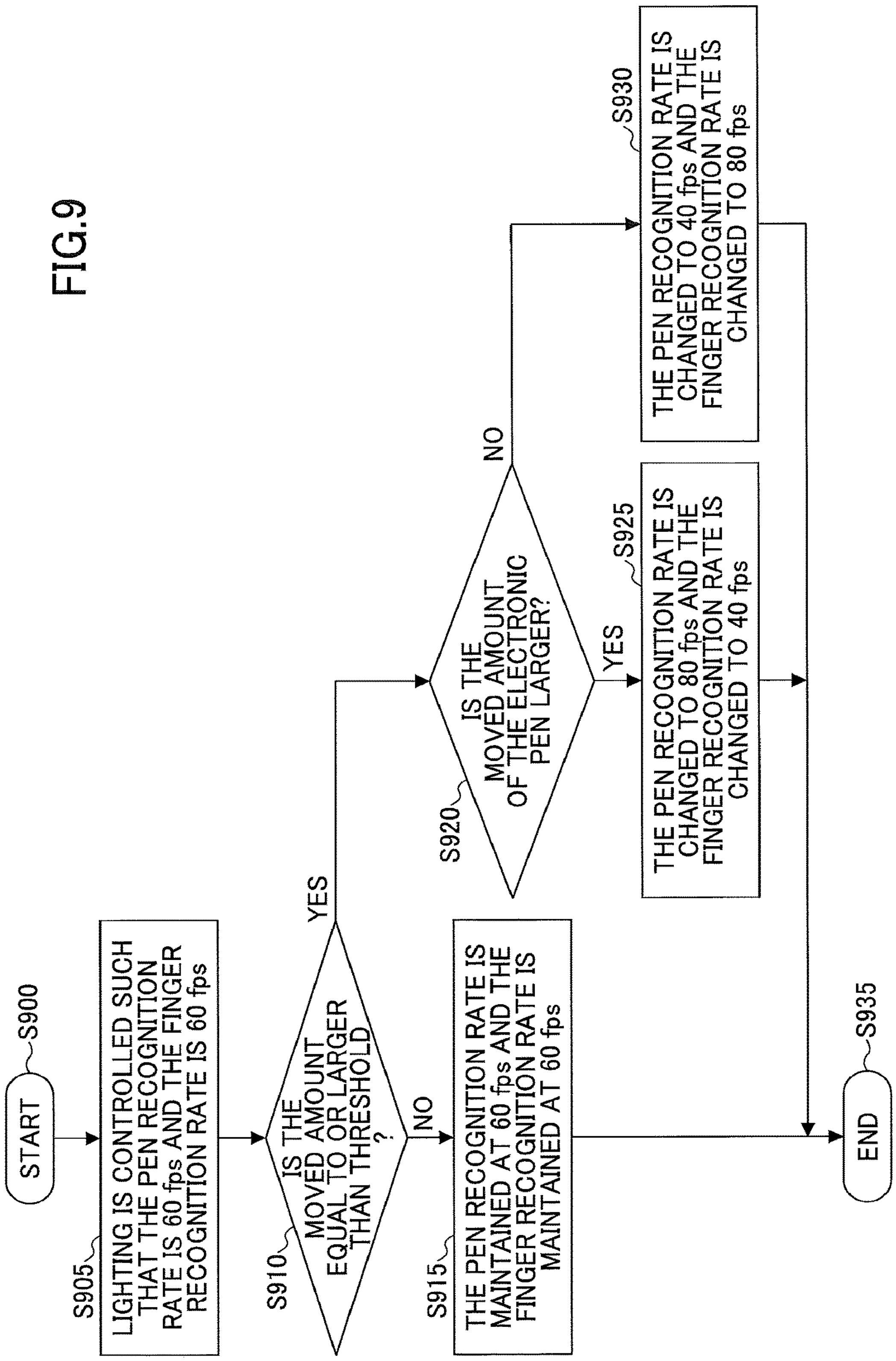
FIG. 9 is a flowchart of a process of changing recognition rates of the electronic pen and the finger depending on the moved amounts of the electronic pen and the finger.
Figure 10:
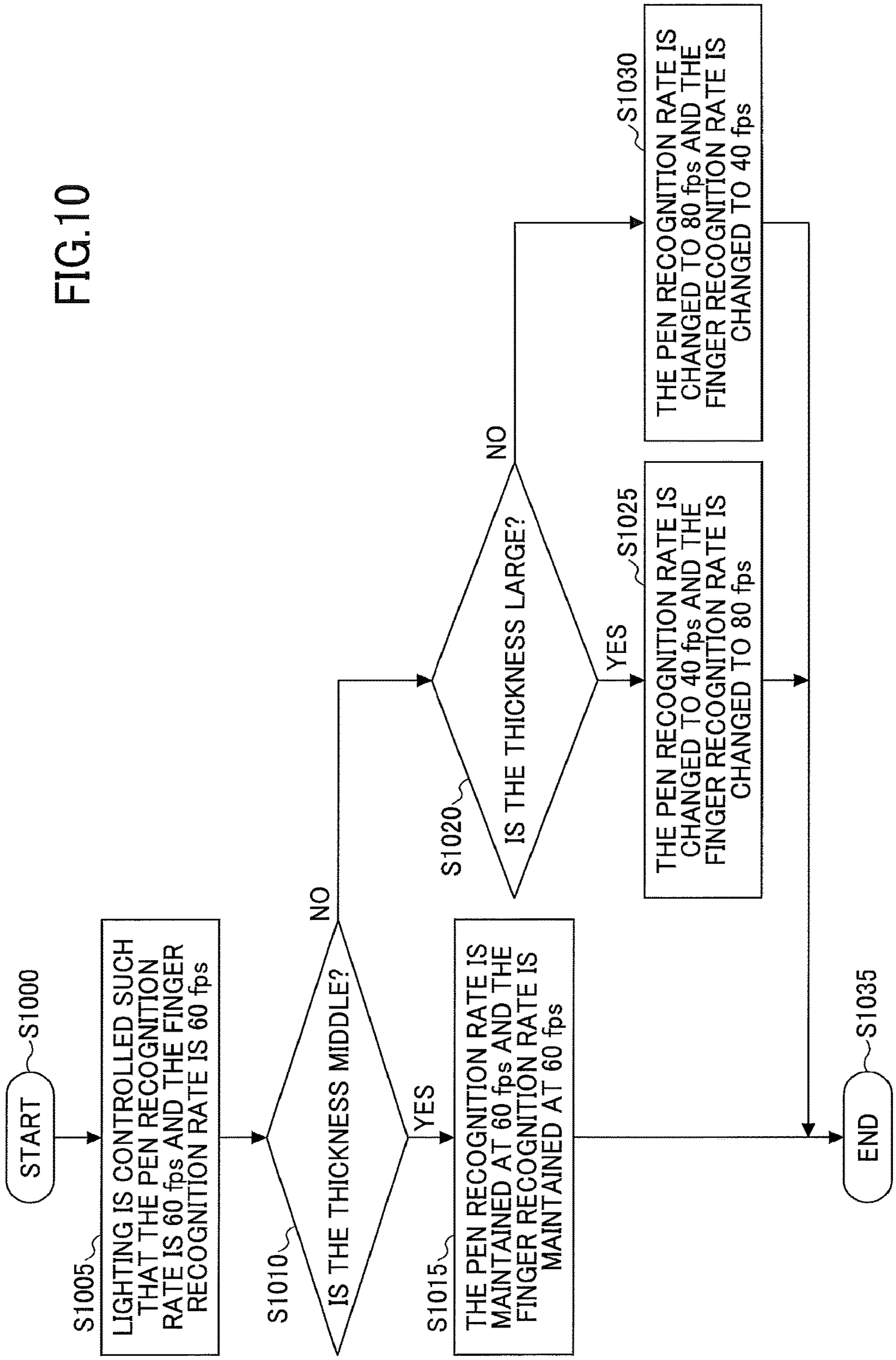
FIG. 10 is a flowchart of a process of changing recognition rates depending on the thickness of the electronic pen.

In the above-described example, when both the electronic pen 12 and the finger are detected, the pen recognition rate and the finger recognition rate are set to the same rate. However, the pen recognition rate and the finger recognition rate may not be necessarily set to the same rate. For example, in order to enhance the tracking performance of tracking one of the electronic pen 12 and the finger, whichever has a higher moving speed, a larger moved amount, or a thicker tip portion to be touched on the display unit 70, the recognition rate of one of the electronic pen 12 and the finger can be faster. Referring to FIG. 8 and FIG. 9, a process of comparing the moved amounts between the electronic pen 12 and the finger and changing the recognition rates will be described. Referring to FIG. 10, a process of changing the recognition rates depending on the difference in thickness of the tip portion of the electronic pen 12 will be described.

FIG. 8 illustrates the moved amounts of the electronic pen 12 and the finger. FIG. 9 is a flowchart of a process of changing the recognition rates depending on the moved amount. In FIG. 8, both the electronic pen 12 and the finger 80 exist on the display unit 70 of the electronic whiteboard 10, and both the electronic pen 12 and the finger 80 are used for inputting information. The electronic whiteboard 10 includes two imaging units 72 arranged at respective two corners on top side of the rectangular display unit 70. Two irradiating units 71 are respectively arranged adjacently or proximately to the two imaging units 72. The electronic whiteboard 10 also includes the retroreflector 77 adjacently or proximately to three sides, except for the upper side where the two imaging units 72 are arranged, in the display unit 70.

The moved amounts of the electronic pen 12 and the finger 80 for a certain period, for example, for 100 milliseconds are calculated from the positions detected by the position detector 75. The positions may include coordinates. Then, the averages of the moved amounts are calculated. The averages of the moved amounts can be calculated, for example, for five seconds. In FIG. 8, ΔA is the average of the moved amounts of the electronic pen 12, and ΔB is the average of the moved amounts of the finger 80. Then, ΔA and ΔB are compared. In order to enhance the tracking performance of tracking one of the electronic pen 12 and the finger 80, whichever has a larger moved amount, the recognition rates can be changed depending on the difference. A calculator may be included additionally, so that the calculator can calculate such a moved amount.

However, changing the recognition rates depending on the difference may lead to frequent changes. Such frequent changes complicate the control process. For this reason, a threshold can be set. The recognition rates can be changed when the difference is equal to or larger than such a threshold.

Figure 7:
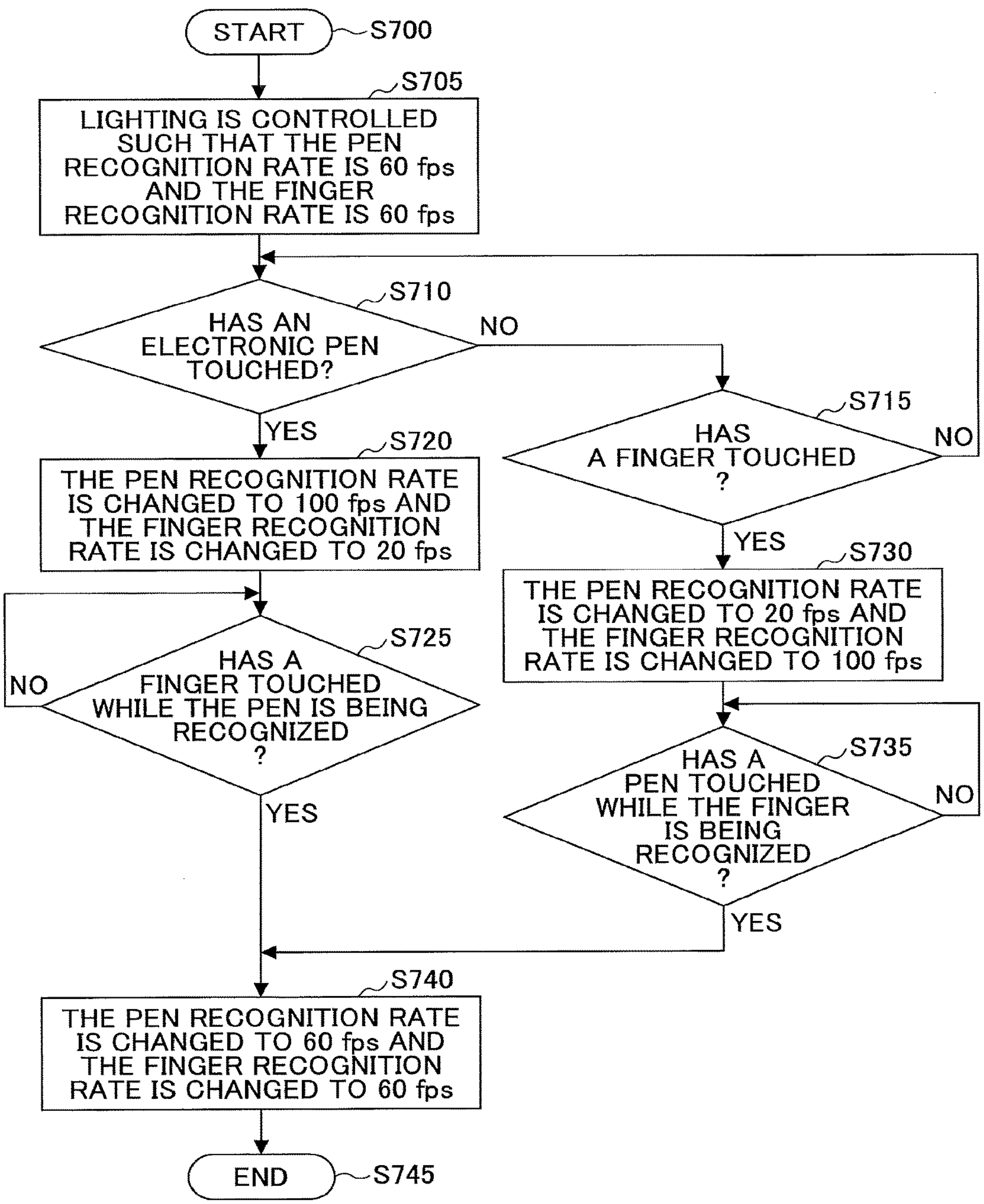
FIG. 7 is a flowchart of a process of identifying the electronic pen and the finger.

The process of comparing the moved amounts and changing the recognition rates starts from step S900, after both of the touches of the electronic pen 12 and the finger 80 are detected and the pen recognition rate and the finger recognition rate are both changed to 60 fps, in step S740 of FIG. 7. In step S905, to calculate the averages of the moved amounts, the lighting is controlled so that the pen recognition rate is 60 fps and the finger recognition rate is 60 fps.

In step S910, the averages of the moved amounts are both calculated, and then "is the difference between the averages is equal to larger than a threshold?" is determined. When the difference is smaller than the threshold, the process goes to step S915. The pen recognition rate and the finger recognition rate are both maintained at 60 fps. The process ends in step S935. When the difference is equal to or larger than the threshold, "is the moved amount of the electronic pen 12 is larger than the moved amount of the finger?" is determined in step S920. When the moved amount of the electronic pen 12 is larger, the process goes to step S925. In step S925, the pen recognition rate is changed to 80 fps and the finger recognition rate is changed to 40 fps. The process ends in step S935.

When the moved amount of the finger is larger than the moved amount of the electronic pen 12, the process goes to step S930. In step S930, the pen recognition rate is changed to 40 fps and the finger recognition rate is changed to 80 fps. The process ends in step S935. As described above, by enhancing the tracking performance of tracking one of the electronic pen 12 and the finger 80, whichever has a larger moved amount, the accuracy in detecting the position of the electronic pen 12 or the finger 80 is improved.

FIG. 10 is a flowchart of a process of changing the recognition rates depending on the thickness of the electronic pen 12 that touches the display unit 70. Also in this process, touches of both the electronic pen 12 and the finger 80 on the display unit 70 are detected. After the pen recognition rate and the finger recognition rate are both changed to 60 fps in step S740 of FIG. 7, the process starts from step S1000. In step S1005, the lighting is controlled so that the pen recognition rate is 60 fps and the finger recognition rate is 60 fps. The thickness of the tip portion of the pen is checked. With regard to the thickness, "middle" is a size that falls within a given range; "large" is a size that is larger than the upper limit of the given range; and "small" is a size that is smaller than the lower limit of the given range. The thickness of the pen can be set to any one of "large", "middle", and "small". As an example, in default settings, the thickness can be set to "middle".

In step S1010, "is the thickness middle?" is determined. When the thickness is "middle", the process goes to step S1015, the pen recognition rate and the finger recognition rate are both maintained at 60 fps. The process ends in step S1035. When the thickness is "large" or "small", the process goes to step S1020, and determines whether the thickness is "large". When the thickness is "large", the process goes to step S1025. By referring to the table, the pen recognition rate is changed to 40 fps and the finger recognition rate is changed to 80 fps. The process ends in step S1035.

The pen having a large thickness is often used for writing circles or lines such as straight lines rather than writing characters. Even if a time interval of detecting the position is long to some degree, it is easy to estimate a position in such an interval and the interval does not affect the accuracy. Hence, the tracking performance of tracking the pen can be reduced and the tracking performance of tracking the finger can be increased.

When the thickness is "small", the process goes to step S1030. By referring to the table, the pen recognition rate is changed to 80 fps and the finger recognition rate is changed to 40 fps. In step S1035, the process ends. The pen having a small thickness is often used for writing characters and small drawings. The long time interval of detecting the position affects the accuracy. Hence, the tracking performance of tracking the pen can be increased to increase the number of times of detecting the pen position.

Heretofore, changing of the recognition rates depending on the moved amount or the pen thickness has been described. However, the recognition rates can be changed depending on both the moved amount and the pen thickness. The electronic whiteboard 10 consumes the energy by turning on the lighting. The shorter lighting period can reduce the energy consumption. Depending on the energy consumption mode, the recognition rates can be changed. The energy consumption mode may include three steps, for example, "high", "middle", and "low".

Figure 11:
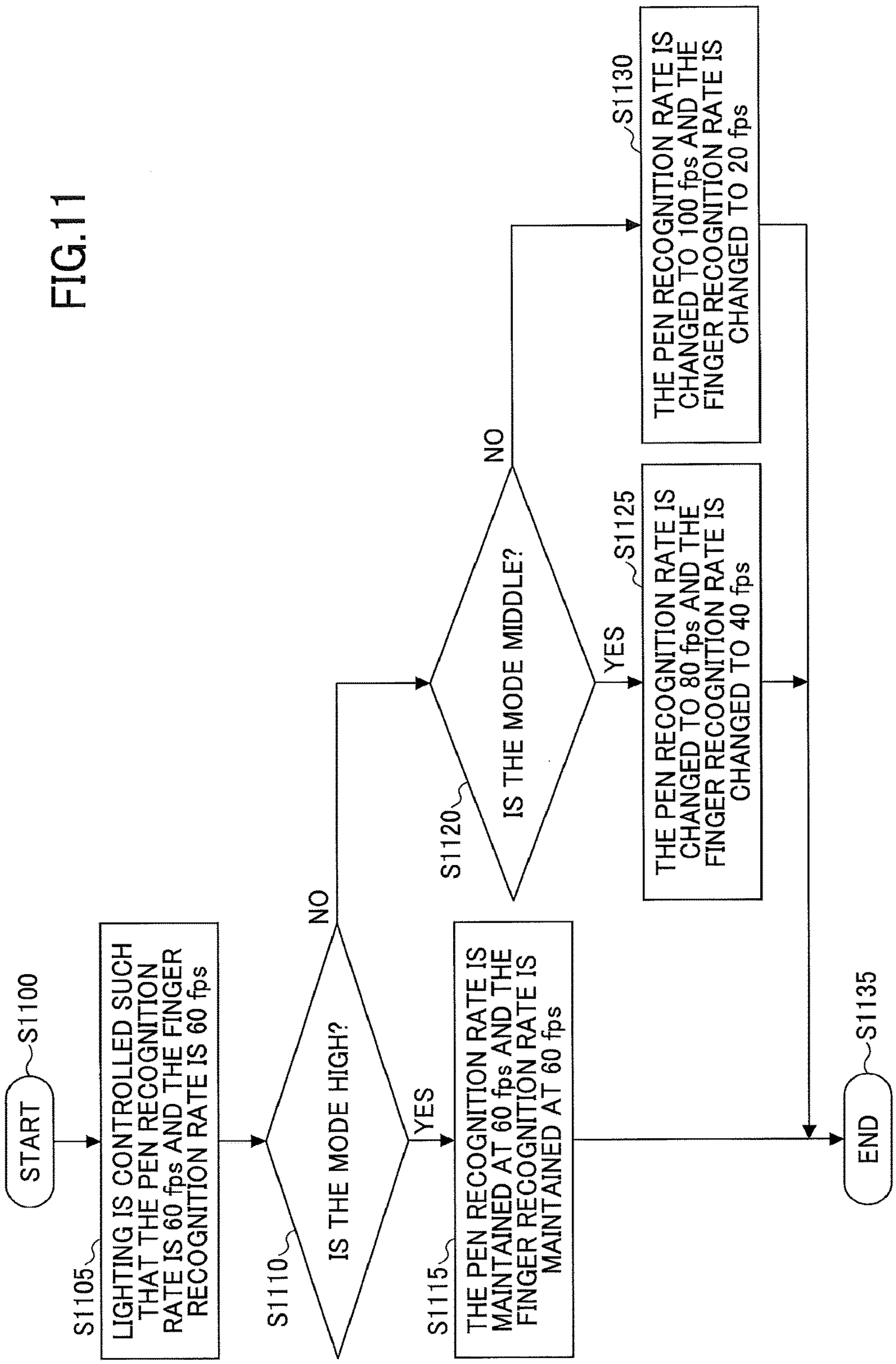
FIG. 11 is a flowchart of a process of changing the recognition rates depending on the set mode of energy consumption.

FIG. 11 is a flowchart of changing the recognition rates depending on the energy consumption mode. Also in this process, touches of both the electronic pen 12 and the finger 80 on the display unit 70 are detected. After the pen recognition rate and the finger recognition rate are both changed to 60 fps in step S740 (see FIG. 7), the process starts from step S1100. In step S1105, the lighting is controlled so that the pen recognition rate is 60 fps and the finger recognition rate is 60 fps. Then, the energy consumption mode that has been set is checked. The default mode is set to "high".

In step S1110, whether the mode is "high" is determined. When the mode is "high", the process goes to step S1115. The pen recognition rate and the finger recognition rate are both maintained at 60 fps. The process ends in step S1135. When the mode is "middle" or "low", the process goes to step S1120, and whether the mode is "middle" is determined. When the mode is "middle", the process goes to step S1125. By referring to the table, the pen recognition rate is changed to 80 fps and the finger recognition rate is changed to 40 fps. The process ends in step S1135.

When the mode is "middle", in order to reduce the energy consumption from the normally set "high", the finger recognition rate is reduced and the pen recognition rate is increased to shorten the lighting period. In the normally set "high", the lighting period and non-lighting period are same in the unit time. However, when the mode is "middle", the lighting period is a half the non-lighting period in the unit time.

When the mode is "low", the process goes to step S1130. By referring to the table, the pen recognition rate is set to 100 fps and the finger recognition rate is set to 20 fps. The process ends in step S1135. In order to further shorten the lighting period, the finger recognition rate is reduced and the pen recognition rate is increased. The lighting period is one-fifth the non-lighting period in the unit time. Such a configuration reduces the energy consumption. However, as the finger recognition rate is reduced, the accuracy in detecting the position of the finger will be reduced.

The controller 73 changes the pen recognition rate and the finger recognition rate. The controller 73 causes the irradiating unit 71 to switch the lighting on and off in accordance with the pen recognition rate and the finger recognition rate that have been changed. In the above described embodiments, in the case where switching the lighting on and off is controlled such that the pen recognition rate and the finger recognition rate are both 60 fps, the lighting on and off is switched whenever one image is captured. However, in a case where it is possible to capture 60 images in each the lighting period and the non-lighting period for one second, the lighting on and off is not necessarily switched whenever one image is captured. The lighting may be switched on and off whenever two or three images are captured.

Heretofore, the description has been given with respect to the identification of both the electronic pen 12 and the finger 80 and the detection of the positions of the electronic pen 12 and the finger 80, in the case where the additional information is input by using both the electronic pen 12 and the finger 80. However, a plurality of electronic pens 12 or a plurality of fingers 80 may be used for inputting the additional information. Any material other than fingers may be used for inputting the additional information. In a case where fingers or any other materials that do not emit light are used, it is possible to detect the positions of the fingers or any other materials, but it is impossible to identify the materials. On the other hand, with regard to the plurality of electronic pens 12, it is possible to identify the electronic pens 12 by taking advantage of LEDs that emit light in different wavelengths. In the captured image, it is possible to identify the electronic pens 12 respectively in accordance with the emitted light.

In this case, however, it is necessary to use a filter or a dedicated camera for identifying a plurality of wavelengths. An expensive and complicated system is demanded, accordingly. The electronic pen 12 also consumes the energy, when emitting light. The battery of the electronic pen 12 often runs down. The electronic pen 12 is unusable unless the battery is exchanged or charged.

Therefore, instead of the electronic pen 12 that touches the display unit 70 and then emits light at the tip portion, another type of pen is applicable. Such other type of pen includes a light emitter that absorbs excitation light when the excitation light is irradiated and that emits light without the use of a battery. For a plurality of pens that are used, different types of light emitters are used. Light waves in different wavelengths are absorbed, but light waves in the same wavelengths are emitted. At the time of lighting, the light in a plurality of different wavelengths is irradiated by changing the timings. This configuration causes the plurality of pens to emit light in different colors and makes the pens identifiable from each other by the emitted light.

The light emitter has a phosphorous property of absorbing light (i.e., excitation light) from the outside, and emitting light taking advantage of energy of the excitation light. The light emitter is used in a white LED, for example. In the white LED, blue light of a blue LED partially penetrates through a phosphor layer, but remaining light is absorbed in the phosphor. The absorbed light is changed into yellow light and is then emitted. Such blue light and yellow light are mixed together, and the while light is irradiated.

The phosphor includes a substance that absorbs blue light and emits green light, and a substance that absorbs green light and emits red light. Examples of the phosphor can be fluorescein, rhodamine, coumarin, pyrene, and cyanine. The pen including a phosphor at the top portion is a non-limiting example. The pen including fluorescent coating at the tip portion may be applicable.

Figure 12:
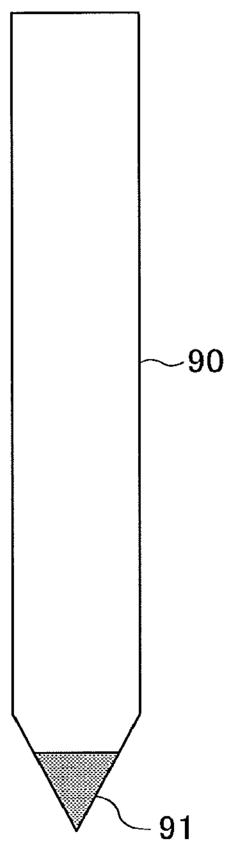
FIG. 12 is a view of a hardware configuration of a pen.

FIG. 12 is a view of a hardware configuration of a pen. Although the electronic pen 12 has been discussed with reference to FIG. 2, a pen 90 illustrated in FIG. 12 includes only a light emitter 91 at the tip portion. The pen 90 does not include the LED 20, the sensor, the communication I/F, or the controller 23. The type of the light emitter 91 may be changed depending on the pen. A plurality of light emitters 91 absorb light in different wavelengths, and emit light in the same wavelengths. This configuration eliminates the need for a filter or a dedicated camera for identifying the plurality of wavelengths. A commonly-used camera may be used for capturing images, accordingly.

Figure 13A:
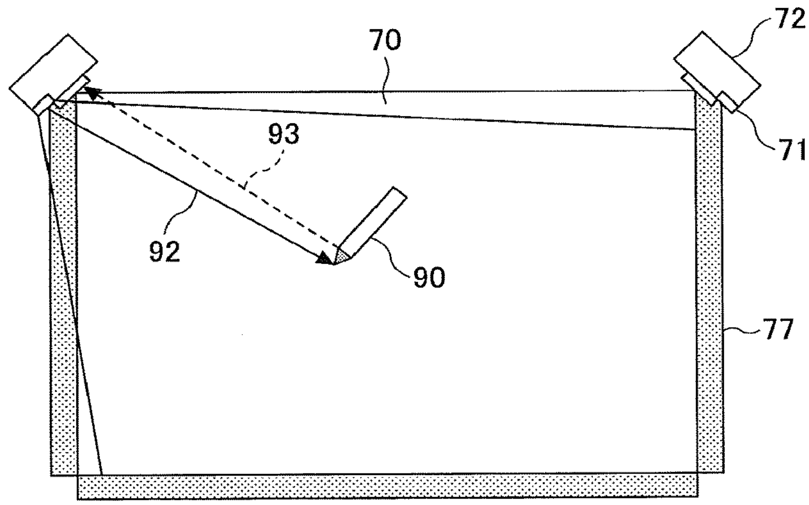
FIG. 13A and FIG. 13B illustrate a method for identifying the pen.
Figure 13B:
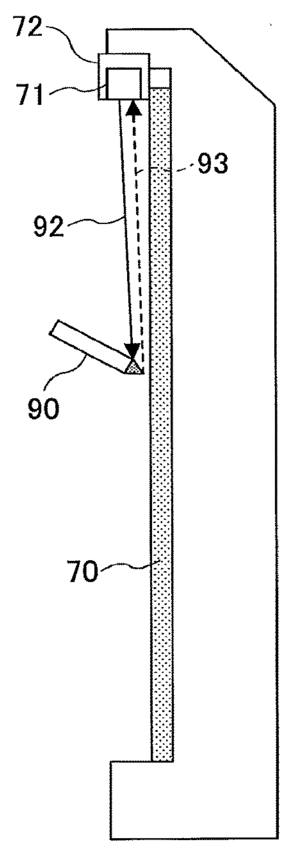

Referring to FIG. 13A and FIG. 13B, a method for identifying the pen illustrated in FIG. 12 will be described. The pen 90 exists on the display unit 70 of the electronic whiteboard 10. The pen 90 is used for inputting additional information. It is to be noted that as illustrated in FIG. 13A, the electronic whiteboard 10 includes two imaging units 72 and two irradiating units 71. The two imaging units 72 are arranged at respective two corners on the top side of the display unit 70 having a rectangular shape. The two irradiating units 71 are respectively arranged adjacently or proximately to the imaging units 72. The two irradiating units 71 respectively irradiate excitation light 92.

In FIG. 13A, two imaging units 72 are illustrated, but one imaging unit 72 capable of detecting the position of the pen 90 may be provided, or three or more imaging units 72 capable of detecting the position of the pen 90 may be provided. The irradiating unit 71 is enabled by a device that irradiates a laser light in parallel to the surface of the electronic whiteboard 10. Such a device may swing the laser light from side to side, or may include a plurality of laser irradiating devices arranged in a matrix, in order to irradiate the whole surface of the display 44 with the excitation light 92.

The phosphor absorbs the excitation light 92 and emits light in a wavelength different from the wavelength of the excitation light 92. The irradiating unit can be arranged adjacently or proximately to the camera 43 that captures an image of an emitted light 93 from the phosphor, and can be arranged to face in the same direction as the camera 43 faces. In an enlarged side view of FIG. 13B, the irradiating unit 71 is arranged to face in the same direction as the imaging unit 72 faces, and irradiates the excitation light 92 in a given wavelength toward the light emitter 91 arranged at the tip portion of the pen 90. Then, the light emitter 91 emits toward the imaging unit 72 the light in a wavelength different from the wavelength of the excitation light 92.

As the pen 90 including the light emitter 91 gets closer to the display unit 70 of the electronic whiteboard 10, the excitation light 92 hits the light emitter 91. Then, the light emitter 91 emits light in a wavelength different from the wavelength of the excitation light 92. The imaging units 72 capture images of the emitted light 93 at different angles. The angle of the pen 90 that emits light is calculated by using the captured images. Then, the position of the pen 90 that emits light is detected in the above-described triangulation method.

In a case where information is input by using a plurality of pens 90, the irradiating unit 71 irradiates laser light in different wavelengths that are same in number with the pens 90, by changing the laser light at certain timings. With regard to the timing of changing the laser light, the controller 73 causes the irradiating unit 71 to change the laser light in a first wavelength to the laser light in a second wavelength.

Figure 14:
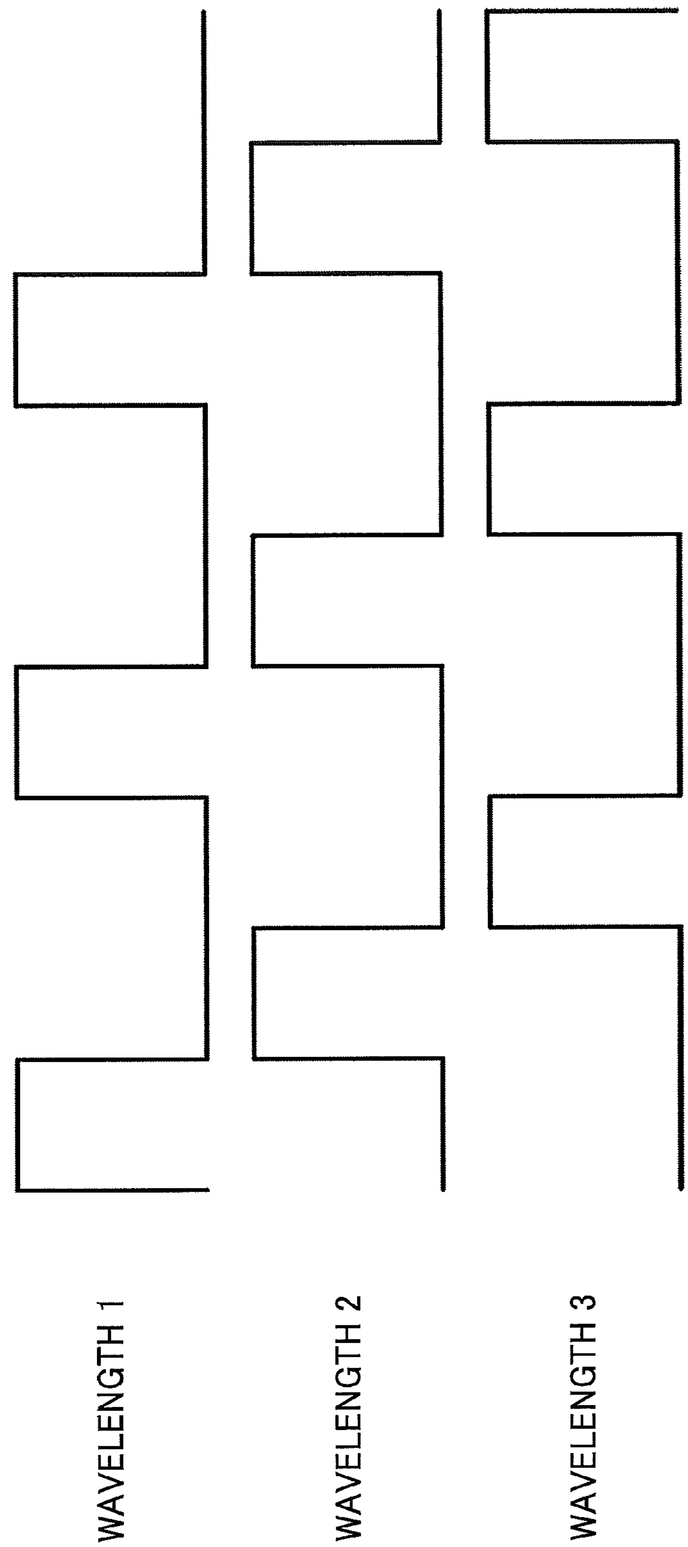
FIG. 14 is a view of one example indicating timings of irradiating light in different wavelengths, when no pen is detected.

FIG. 14 is a view of timings of irradiating the laser light in different wavelengths. In an example of FIG. 14, the pen 90 does not exist on the display unit 70. In other words, the pen 90 is not seen in the image captured by the imaging unit 72. This is an example when the pen 90 is not detected. Here, however, a description will be given with respect to a case where it is assumed that three pens 90 are used and the light in three wavelengths is irradiated.

When the pen 90 is not detected, the laser light in different wavelengths is irradiated by changing the laser light at equal intervals. The operation of irradiating the laser light at equal intervals is referred to as "equal interval scanning by electronic whiteboard". In FIG. 14, first, the laser light in wavelength 1 starts irradiation. Then, the laser light in wavelength 1 stops irradiation, and simultaneously the laser light in wavelength 2 starts irradiation. The laser light in wavelength 2 stops irradiation, and simultaneously the laser light in wavelength 3 starts irradiation. To be specific, each lighting period, in which lighting and non-lighting are switched at high speed, is equally divided into three segments, and the divided segments are respectively assigned to the laser light in different wavelengths. In an example illustrated in FIG. 14, the laser light is controlled such that when a first laser light stops irradiation, a second laser light starts irradiation. However, the laser light control is not limited to this example. After the first laser light stops irradiation and a certain period passes, the second laser light may start irradiation.

Figure 15:
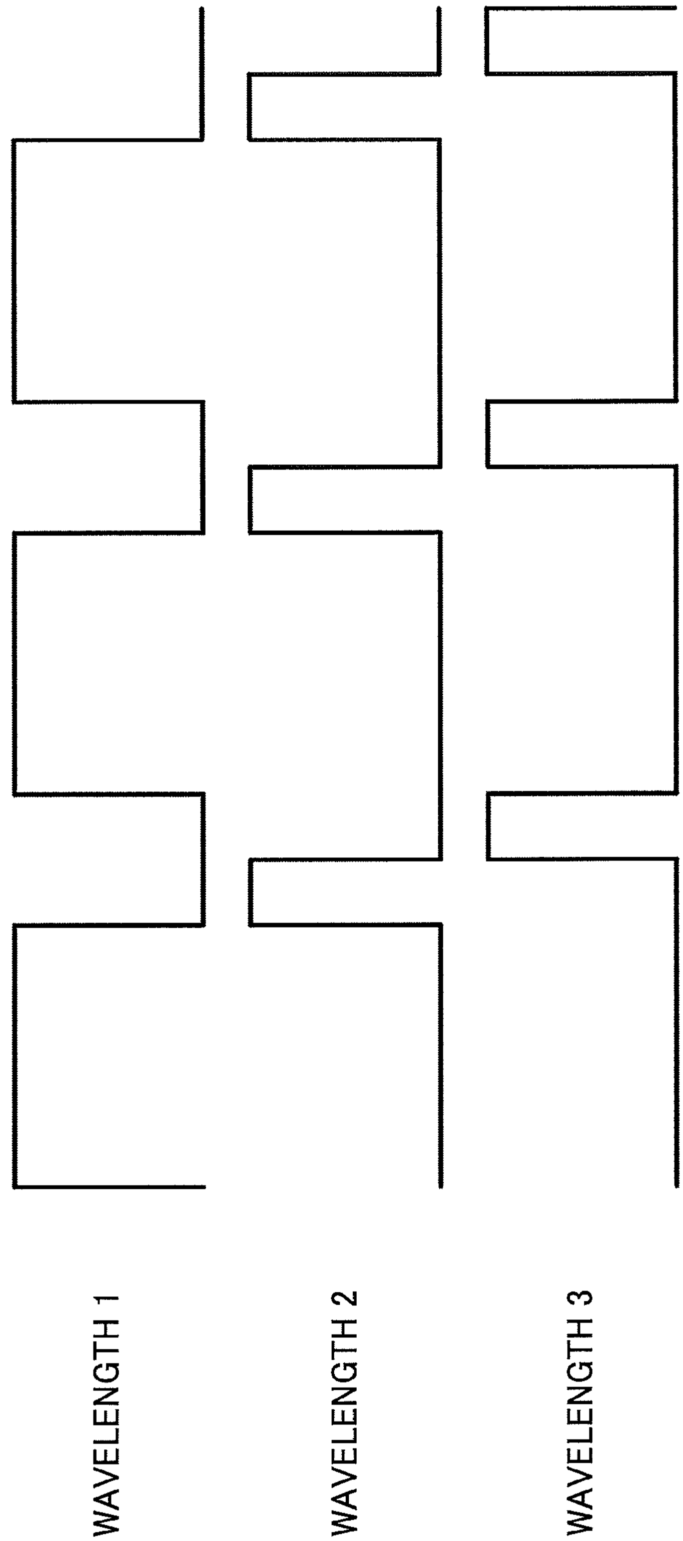
FIG. 15 is a view of one example indicating timings of irradiating the light in the different wavelengths, when one pen is detected.

FIG. 15 is a view of timings of irradiating the laser light, after the pen 90 corresponding to the wavelength 1 is detected. When the pen 90 corresponding to the wavelength 1 is detected, a sufficient period is assigned for irradiating the detected pen 90 with the laser light. In order to enhance the accuracy in detecting the position, the period for irradiating the laser light in wavelength 1 is set longer than each of the periods for irradiating the laser light in wavelengths 2 and 3. The operation of irradiating the laser light at unequal intervals is referred to as "unequal interval scanning by electronic whiteboard". Also in this case, after the first laser light stops irradiation and a certain period passes, the second laser light may start irradiation.

Figure 16:
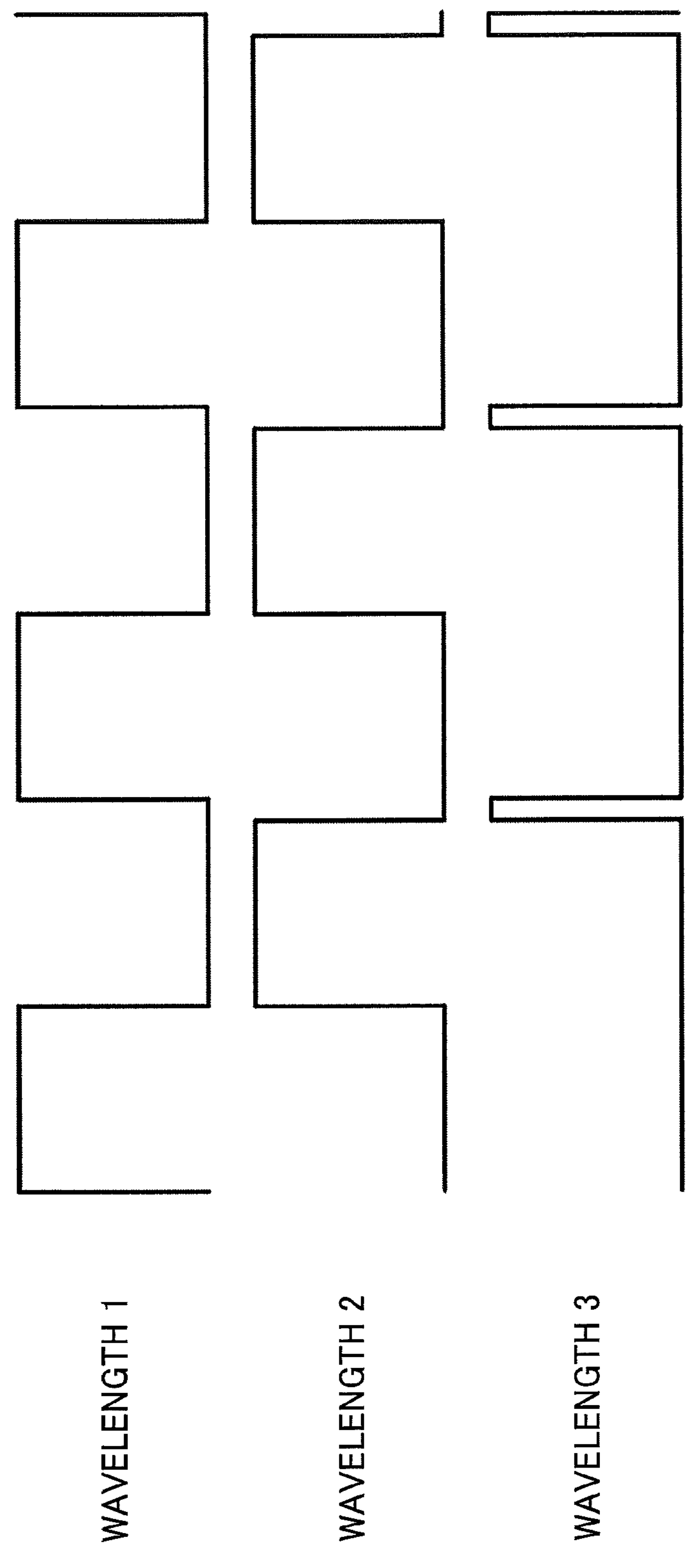
FIG. 16 is a view of one example indicating timings of irradiating the light in the different wavelengths, when two pens are detected.

FIG. 16 is a view of timings of irradiating the laser light, after the pens 90 corresponding to the wavelengths 1 and 2 are detected. When the pens 90 corresponding to the wavelengths 1 and 2 are detected, sufficient periods are assigned for irradiating the detected pens 90 with the laser light. In order to enhance the accuracy in detecting the positions of the pens 90, each of the periods for irradiating the laser light in wavelengths 1 and 2 is set longer than the period for irradiating the laser light in wavelength 3. In order to ensure the period of irradiating the laser light in wavelength 2, the period of irradiating the laser light in wavelength 1 in FIG. 16 is shorter than the period of irradiating only the laser light in wavelength 1 in FIG. 15. However, the period of irradiating the laser light in wavelength 1 in FIG. 16 is set longer than each of the periods of irradiating the laser light when the pen 90 is not detected in FIG. 14. Also in this case, after the first laser light stops irradiation and a certain period passes, the second laser light may start irradiation.

After the pens 90 corresponding to the wavelengths 1, 2, and 3 are detected, the operation returns to the "equal interval scanning by electronic whiteboard", so as to irradiate the laser light at the timings illustrated in FIG. 14. Also in this case, after the first laser light stops irradiation and a certain period passes, the second laser light may start irradiation.

To detect the pen 90, including the light emitter 91, as a phosphor pen and to detect the accurate position of the pen 90, only one pen 90 is to be detected at an identical time point. In a case where a first phosphor pen that emits the laser light in wavelength 1 and a second phosphor pen that emits the laser light in wavelength 2 are used at the same time, only one of the phosphor pens is detected at an identical time point. For this reason, in a case of using at least two phosphor pens that are detected by the laser light in different wavelengths from each other, the accurate positions of the at least two phosphor pens are detected in the above-described method.

In a case of using at least two phosphor pens that are detected by the laser light in the same wavelengths, or in a case of using at the same time a phosphor pen and a light-emitting pen (i.e., electronic pen 12) that emits light through the above-described LED, the at least two pens are detected at an identical time point. In those cases, when at least two pens are close to each other, at least two lights overlap and thus may make it difficult to detect correct positions of the pens.

Figure 17:
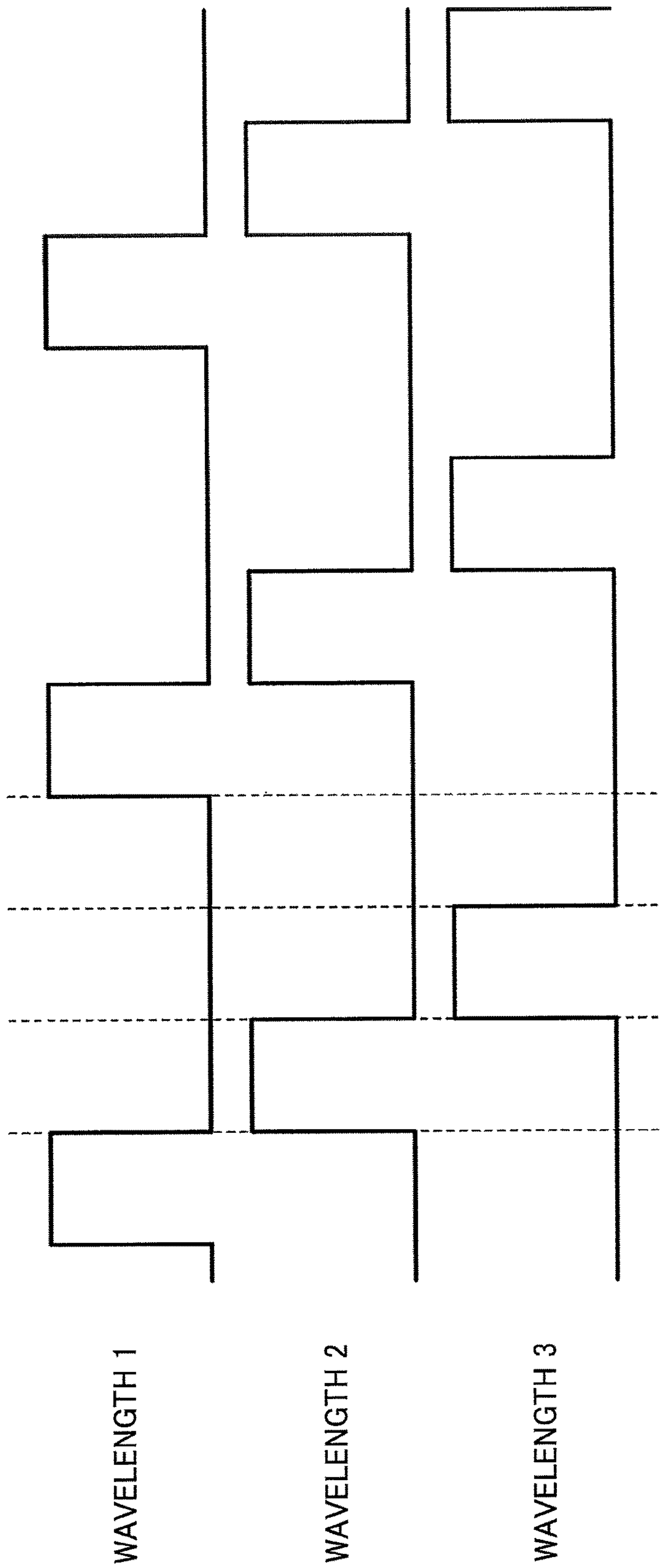
FIG. 17 is a view of another example indicating timings of irradiating the light in the different wavelengths, when no pen is detected.
Figure 18:
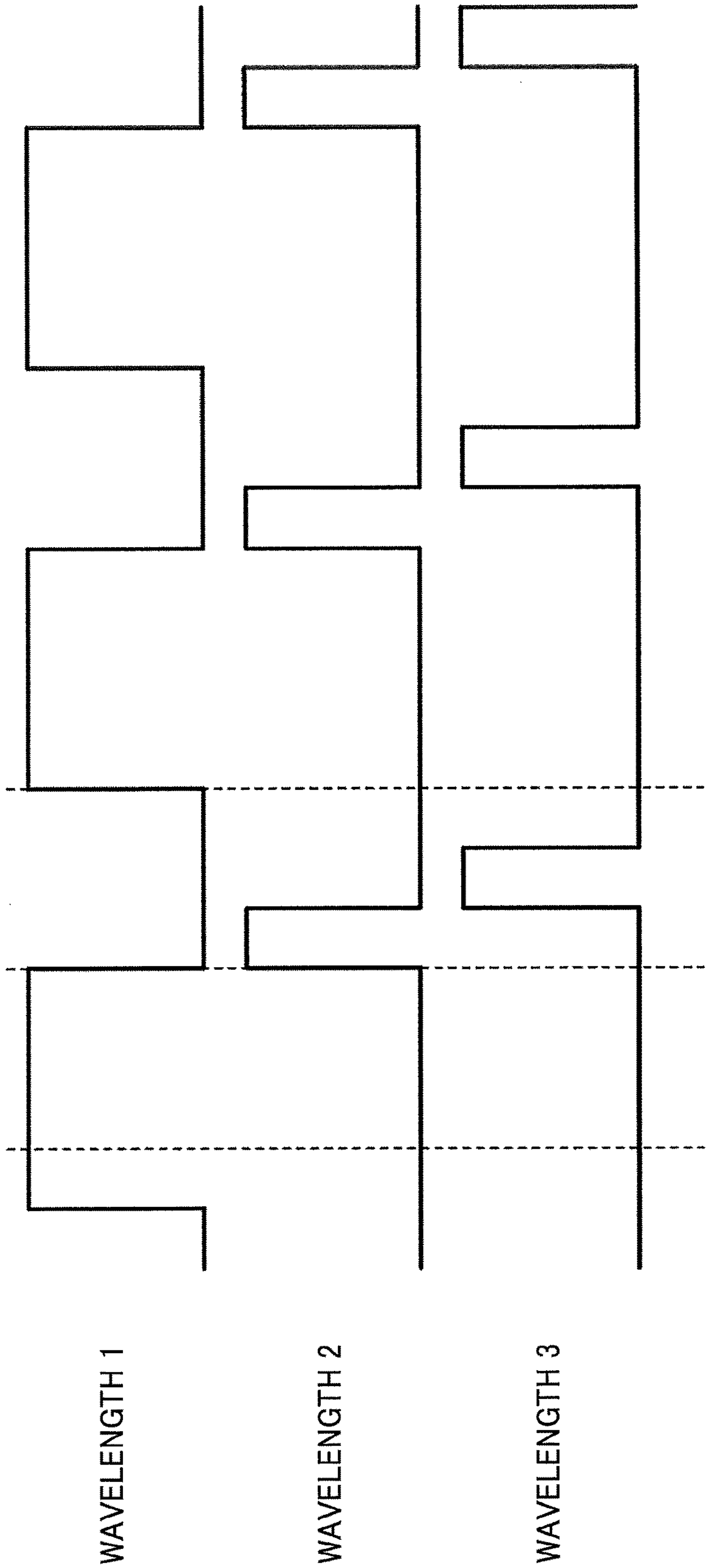
FIG. 18 is a view of another example indicating timings of irradiating the light in the different wavelengths, when one pen is detected.
Figure 19:
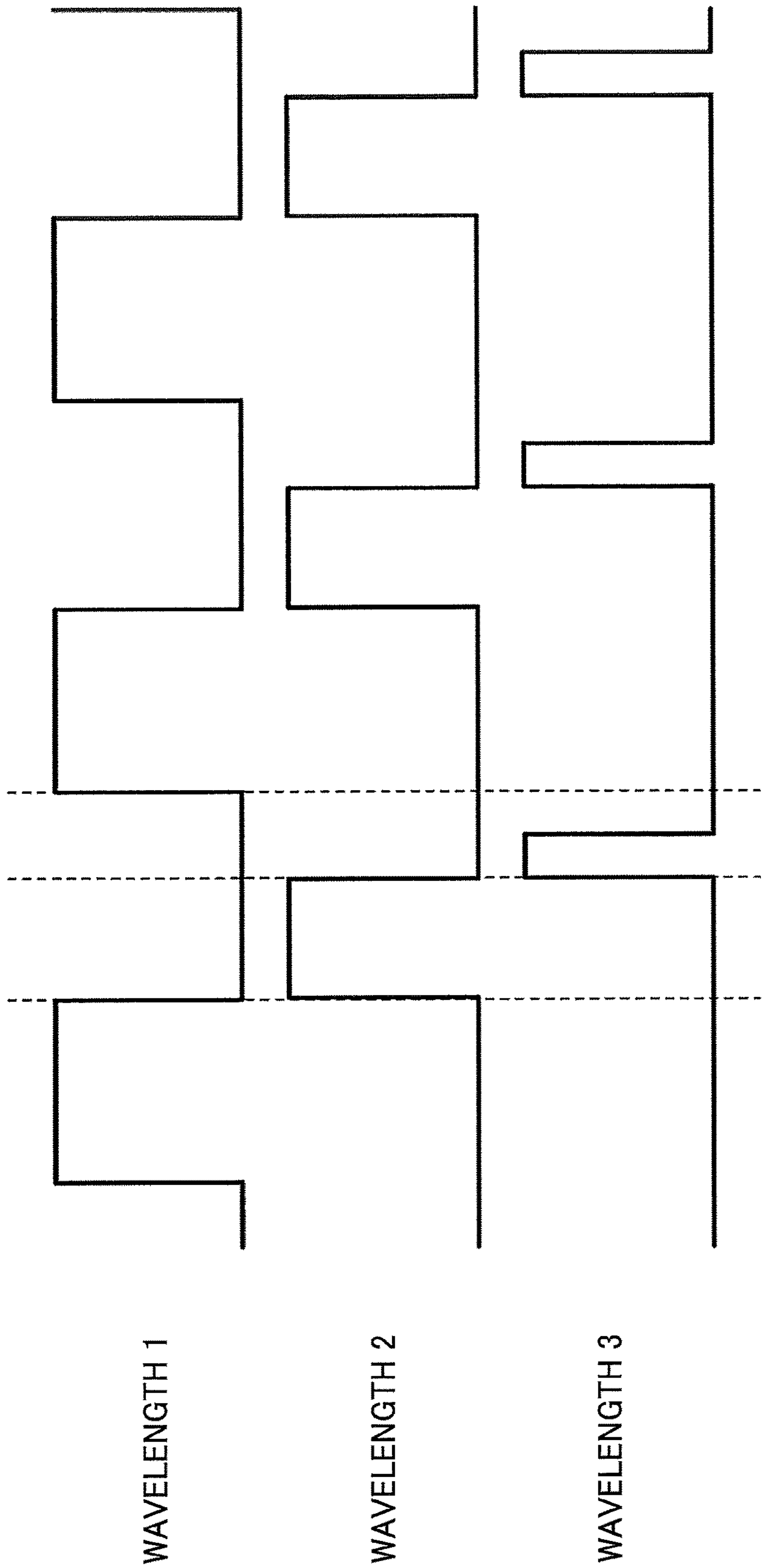
FIG. 19 is a view of another example indicating timings of irradiating the light in the different wavelengths, when two pens are detected.

In order to deal with this situation, the light-emitting pens are configured to have individual light-emitting patterns, and to provide non-irradiating periods while no laser light is irradiated, as illustrated in FIG. 17 to FIG. 19. FIG. 17 is a view of timings of irradiating the laser light in different wavelengths. FIG. 17 illustrates a case where neither phosphor pen nor light-emitting pen exists on the display unit 70. In FIG. 17, a non-irradiating period is assigned to have a same period as the irradiating period in each wavelength. The laser light is controlled such that after such a non-irradiating period passes, the laser light in the wavelength 1 starts irradiation again. To be specific, a certain period of time is divided into four segments. Three segments are respectively assigned to the laser light in three wavelengths, and the remaining one segment is assigned to the non-irradiating period.

FIG. 18 is a view of timings of irradiating the laser light after the phosphor pen corresponding to the wavelength 1 is detected. In FIG. 18, a sufficient period is assigned for irradiating the detected phosphor pen with the laser light. In order to enhance the accuracy in detecting the position, the period for irradiating the laser light in wavelength 1 is set longer than each of the periods for irradiating the laser light in wavelengths 2 and 3.

FIG. 19 is a view of timings of irradiating the laser light, after the phosphor pens corresponding to the wavelengths 1 and 2 are detected. When the phosphor pens corresponding to the wavelengths 1 and 2 are detected, sufficient periods are assigned for irradiating the detected phosphor pens with the laser light. In order to enhance the accuracy in detecting the positions, each of the periods for irradiating the laser light in wavelengths 1 and 2 are is longer than the period for irradiating the laser light in wavelength 3.

Figure 20:
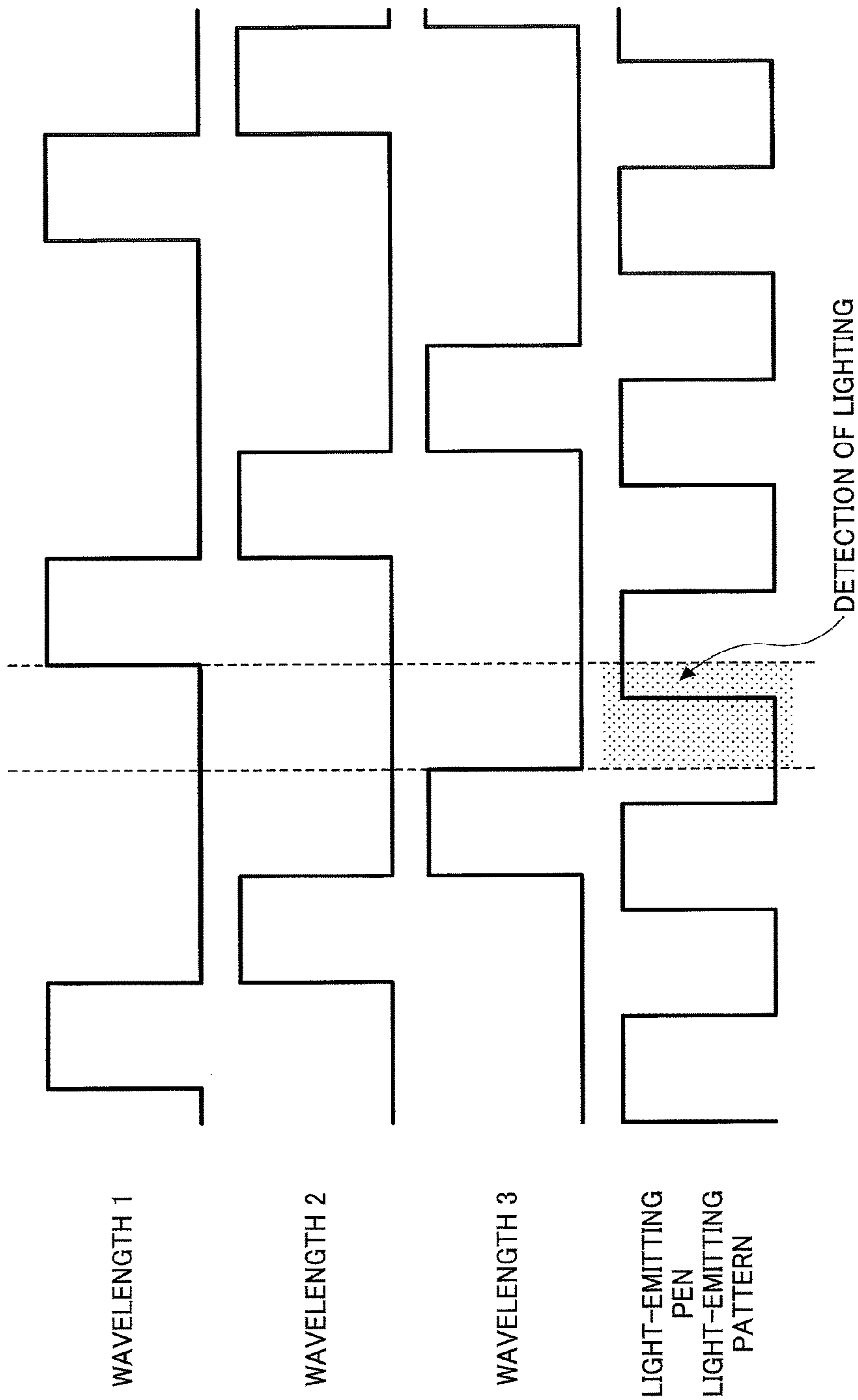
FIG. 20 is a view of timings of detecting a light-emitting pen.

As illustrated in FIG. 20, the light-emitting pen is configured to have a unique light-emitting pattern of repeating turning on and off at certain time intervals. In a non-irradiating period indicated by gray in FIG. 20, no laser light in wavelengths 1 to 3 is irradiated. Since no phosphor pen emits light, no phosphor pen is detected. The light-emitting pens, however, emit light individually. Therefore, it is possible to detect a light-emitting pen in the non-irradiating period.

Figure 21:
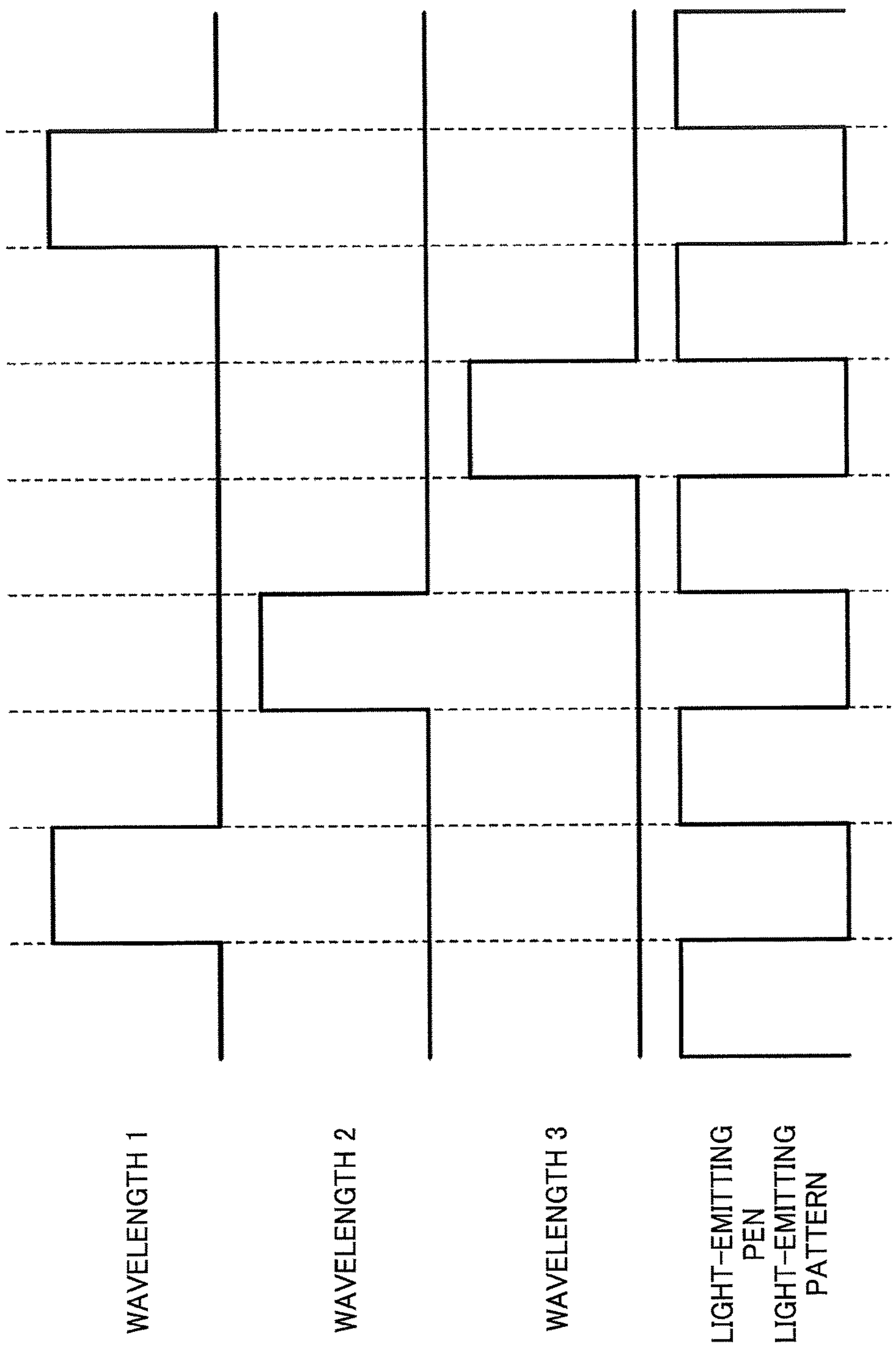
FIG. 21 is a view of timings of irradiating the light in the different wavelengths to be controlled in synchronization with turn-off timings of the light-emitting pen.

In an example of FIG. 20, the lighting of the light-emitting pen overlaps the non-irradiating period in a short period. The light-emitting pen can be detected, but the accuracy is low in detecting the position of the light-emitting pen. As illustrated in FIG. 21, irradiation of the laser light in different wavelengths can be controlled in synchronization with turn-off timings of the light-emitting pen. To be specific, when the light-emitting pen turns off, the laser light in wavelength 1 starts irradiation. When the light-emitting pen turns on, the laser light in wavelength 1 stops irradiation. When the light-emitting pen turns off next time, the laser light in wavelength 2 starts irradiation. When the light-emitting pen turns on, the laser light in wavelength 2 stops irradiation. When the light-emitting pen turns off next time, the laser light in wavelength 3 starts irradiation. When the light-emitting pen turns on, the laser light in wavelength 3 stops irradiation. The operation of irradiating the laser light at equal intervals in synchronization with the turn-off timings of the light-emitting pen is referred to as "equal interval scanning by light-emitting pen".

In the above-described control process, when the phosphor pen and the light-emitting pen are both used for inputting information, both the phosphor pen and the light-emitting pen are separately detected and the accuracy in detecting the positions is enhanced. The controller 73 can perform the above-described control process. This control process is enabled by the controller 73 causing the irradiating unit 71 to change the laser light in the plurality of different wavelengths. The control process is also enabled by switching the irradiation and non-irradiation.

Figure 22:
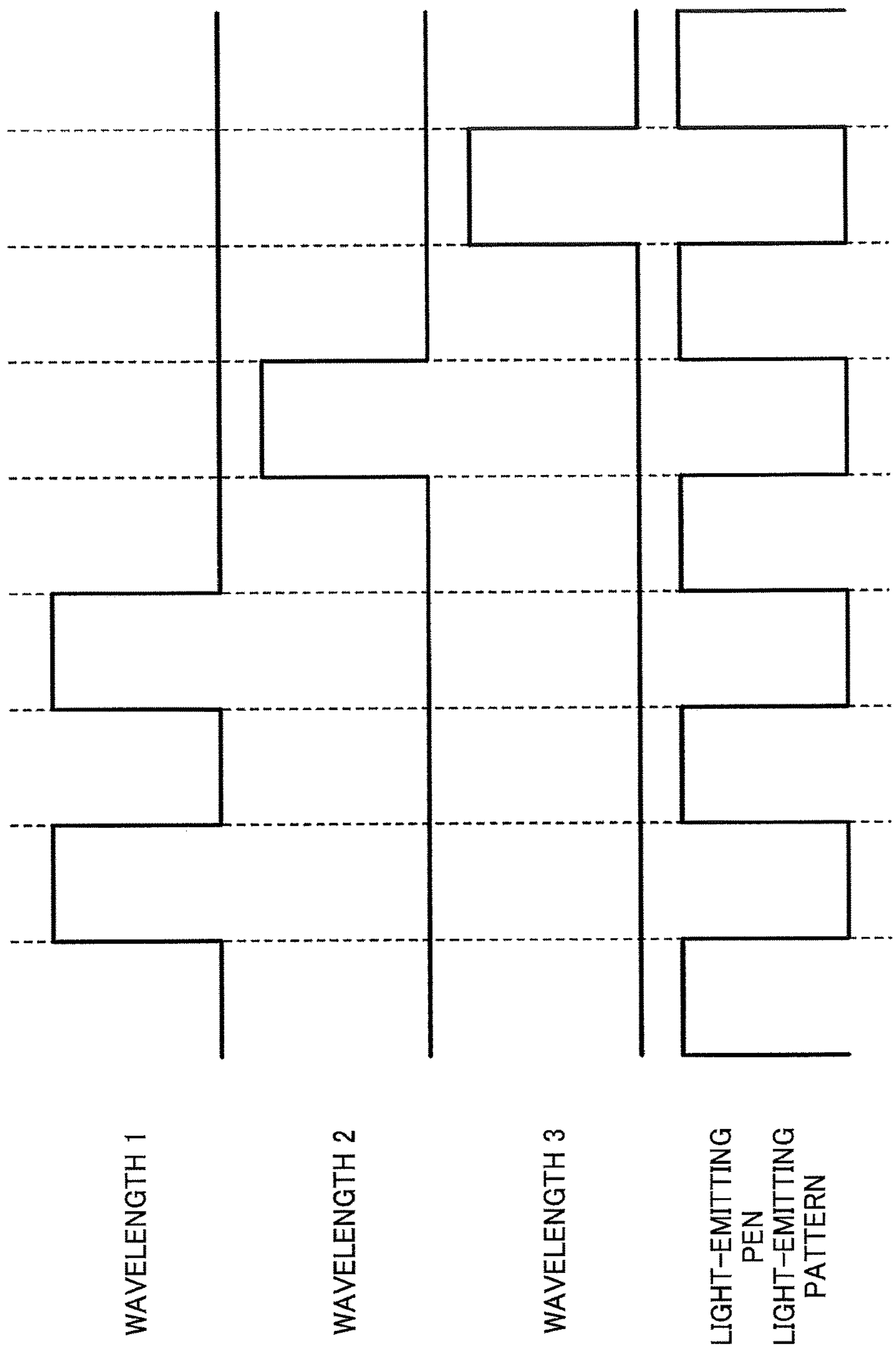
FIG. 22 is a view of timings of irradiating the light in the different wavelengths to be controlled in synchronization with turn-off timings of the light-emitting pen, when a phosphor pen is detected.

When both the light-emitting pen and the phosphor pen are detected, the number of times of irradiating the laser light can be increased depending on the phosphor pen to be used, in order to enhance the accuracy in detecting the position of the phosphor pen, as illustrated in FIG. 22. In an example of FIG. 22, to synchronize with the turn-off timings of the light-emitting pen and to enhance the accuracy in detecting the position of the phosphor pen in wavelength 1, the control process is performed such that the laser light in wavelength 1 is irradiated twice and then the laser light in wavelengths 2 and 3 are irradiated. Such an operation of irradiating the laser light at unequal intervals in synchronization with the turn-off timings of the light-emitting pen is referred to as "unequal interval scanning by light-emitting pen".

The transition in scanning in the above-described control process will be described with reference to a state transition diagram of FIG. 23. When there is no pen on the display unit 70, which is a state of "no pen", the "equal interval scanning by electronic whiteboard" is performed. In order to input information with a phosphor pen, a phosphor pen is placed on the display unit 70 and then the phosphor pen is detected. The state transits to "no light-emitting pen, phosphor pen is detected". The "unequal interval scanning by electronic whiteboard" is performed. This elongates the period of irradiating the laser light in the wavelength corresponding to the phosphor pen, and enhances the accuracy in detecting the position of the phosphor pen.

When the phosphor pen is detached from the display unit 70, no phosphor pen is detected and the state returns to "no pen" again. Then, the "equal interval scanning by electronic whiteboard" is performed.

In order to input information with a light-emitting pen, a light-emitting pen is placed on the display unit 70, and then the light-emitting pen is detected. The state transits to "light-emitting pen is detected, no phosphor pen". The "equal interval scanning by light-emitting pen" is performed. This configuration controls the laser light in the wavelengths to respectively irradiate in synchronization with the turn-off timings of the light-emitting pen, and enhances the accuracy in detecting the position of the light-emitting pen.

When the light-emitting pen is detached from the display unit 70, no light-emitting pen is detected and the state returns to "no pen" again. Then, the "equal interval scanning by electronic whiteboard" is performed.

In the state of "no light-emitting pen, phosphor pen is detected", a light-emitting pen is placed on the display unit 70, such a light-emitting pen is detected, and then the state transits to "light-emitting pen is detected, phosphor pen is detected". Then, the state transits to the "unequal interval scanning by light-emitting pen". In other words, both the light-emitting pen and the phosphor pen exist on the display unit 70, and both the light-emitting pen and the phosphor pen are being used for inputting information. In the "unequal interval scanning by light-emitting pen", both the light-emitting pen and the phosphor pen are detected, and the accuracy in detecting the position of the phosphor pen is enhanced.

In the state of "light-emitting pen is detected, no phosphor pen", a phosphor pen is placed on the display unit 70, such a phosphor pen is detected, and then the state transits to "light-emitting pen is detected, phosphor pen is detected". Then, the "unequal interval scanning by light-emitting pen" is performed. In the "unequal interval scanning by light-emitting pen", both the light-emitting pen and the phosphor pen are detected, and the accuracy in detecting the position of the phosphor pen is enhanced.

In the state of "light-emitting pen is detected, phosphor pen is detected", the light-emitting pen is detached from the display unit 70, no light-emitting pen is detected, and then the state returns to "no light-emitting pen, phosphor pen is detected" again. The "unequal interval scanning by electronic whiteboard" is performed. On the other hand, in the state of "light-emitting pen is detected, phosphor pen is detected", the phosphor pen is detached from the display unit 70. The phosphor pen is not detected, and then the state returns to "light-emitting pen is detected, no phosphor pen" again. The "equal interval scanning by light-emitting pen" is performed.

Figure 23:
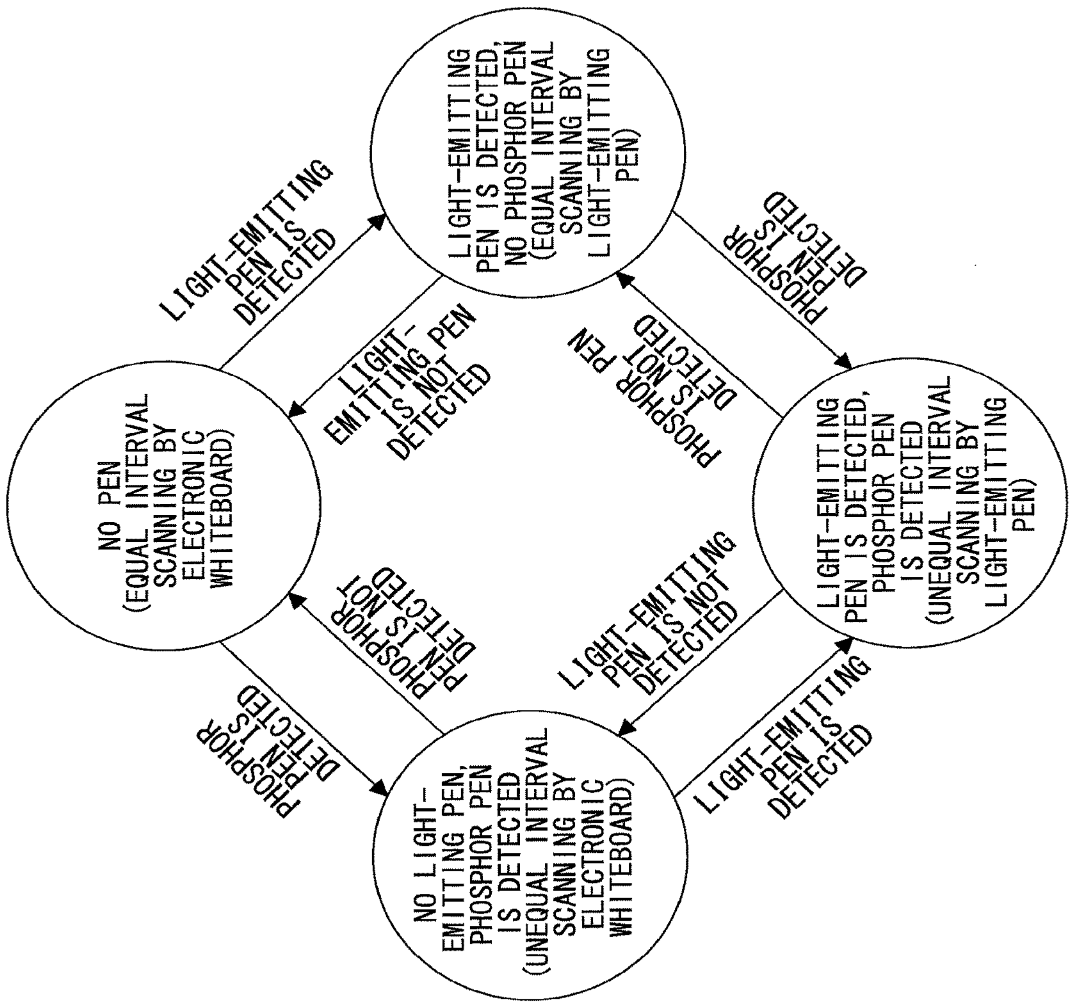
FIG. 23 is a state transition view to transit the state depending on presence or absence of the phosphor pen and the light-emitting pen.

When both the phosphor pen and the light-emitting pen are detached from the display unit 70 at the same time, no pen exists on the display unit 70, although this state is not illustrated in FIG. 23. The state transits to "no pen", and the "equal interval scanning by electronic whiteboard" is performed. On the other hand, when both the phosphor pen and the light-emitting pen are placed on the display unit 70 at the same time, the state transits from "no pen" to "light-emitting pen is detected, phosphor pen is detected", and the "unequal interval scanning by light-emitting pen" is performed.

Figure 24:
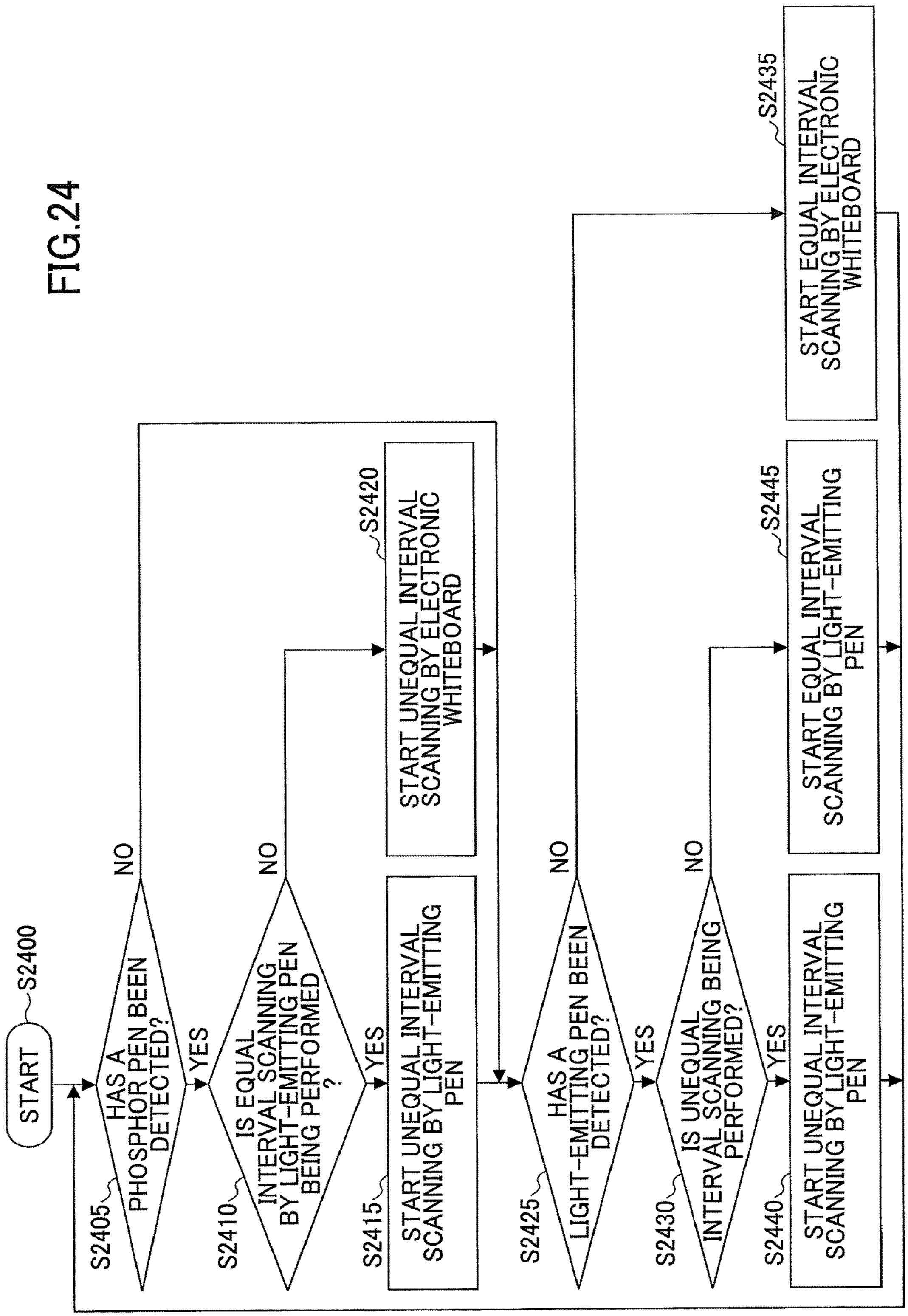
FIG. 24 is a flowchart of a control process of changing a scanning method.

Referring to FIG. 24, a control process of changing the above-described scanning method will be described. Such a control process is performed by the controller 73 of FIG. 5. The control process starts from step S2400. In step S2405, whether a phosphor pen has been detected in determined.

The controller 73 is capable of determining whether the phosphor pen has been detected. This determination is based on whether the light emitted from the phosphor pen is seen in the image captured by the imaging unit 72. When the phosphor pen is detected, the process goes to step S2410. When no phosphor pen is detected, the process goes to step S2425.

In step S2410, whether the "equal interval scanning by light-emitting pen" is being performed is determined. When the "equal interval scanning by light-emitting pen" is performed, the process goes to step S2415. In order to enhance the accuracy in detecting the position of the phosphor pen, the state transits to the "unequal interval scanning by light-emitting pen", and the scanning starts. In this case, both the phosphor pen and the light-emitting pen are detected. On the other hand, when the "equal interval scanning by light-emitting pen" is not performed, that is only a phosphor pen is detected. The process goes to step S2420. In order to enhance the accuracy in detecting the position of the phosphor pen, the "unequal interval scanning by electronic whiteboard" starts.

In step S2425, whether the light-emitting pen has been detected is determined. When the light-emitting pen is detected, the process goes to step S2430 to determine whether any one of the "unequal interval scanning by light-emitting pen" and the "unequal interval scanning by electronic whiteboard" is being performed. On the other hand, when no light-emitting pen is detected, it means that neither a light-emitting pen nor a phosphor pen is detected, the process goes to step S2435 and starts the "equal interval scanning by electronic whiteboard".

When it is determined in step S2430 that any one of the "unequal interval scanning by light-emitting pen" and the "unequal interval scanning by electronic whiteboard" is performed, it means that both the light-emitting pen and the phosphor pen are detected. The process goes to step S2440, and starts the "unequal interval scanning by light-emitting pen". It is to be noted that when the "unequal interval scanning by light-emitting pen" has already started, the scanning continues.

When it is determined in step S2430 that any one of the "unequal interval scanning by light-emitting pen" and the "unequal interval scanning by electronic whiteboard" is not being performed, it means that only the light-emitting pen is detected. Hence, the process goes to step S2445, and starts the "equal interval scanning by light-emitting pen". After starting the scanning process, the process returns to step S2405, and repeats the same process.

As described above, a non-irradiating period while no laser light is irradiated is assigned. In such a non-irradiating period, the light-emitting pen is detected. This configuration enables detection of both the light-emitting pen and the phosphor pen, and also enables detection of positions of both the light-emitting pen and the phosphor pen, when both the light-emitting pen and the phosphor pen are used for inputting information. The light-emitting pattern of the light-emitting pen is configured to repeat turning on and off at certain time intervals, so that the laser light in the wavelengths are controlled to irradiate in synchronization with the turn-off timings, and thus the accuracy in detecting the position of the light-emitting pen is enhanced. In addition, in synchronization with the turn-off timings, the order and the number of irradiating the laser light in the wavelengths are changed so that the irradiating periods are assigned at unequal intervals. The accuracy in detecting the position of the light-emitting pen is enhanced, accordingly.

In the above description, a finger, a light-emitting pen, and a phosphor pen are detected and the positions of the finger, the light-emitting pen, and the phosphor pen are detected. In the above examples, even when none of the finger, the light-emitting pen, or the phosphor pen exists on the electronic whiteboard 10 (e.g., the information display system is not used), turning on the lighting and image capturing by the imaging unit 72 are configured to continue. This is because the detection of a finger or any similar thing is enabled at any time. In a case where the information display system is not used for a certain period of time, however, turning on the lighting and capturing an image continuously waste the energy, if turning on the lighting and capturing an image continue in the same manner as the case where the system is used (i.e., in a normal operation).

As one method for reducing the energy consumption, the frame rate of the camera serving as the imaging unit 72 can be reduced, when the system is not used for a certain period of time. The frame rate indicates the number of images captured by a camera in the unit time (e.g., one second). The camera may be configured to capture one image by alternately switching the lighting on and off. It is to be noted that when the image can be captured in turning on the lighting, the lighting period may be shorter than the lighting period in a normal operation.

Figure 25:
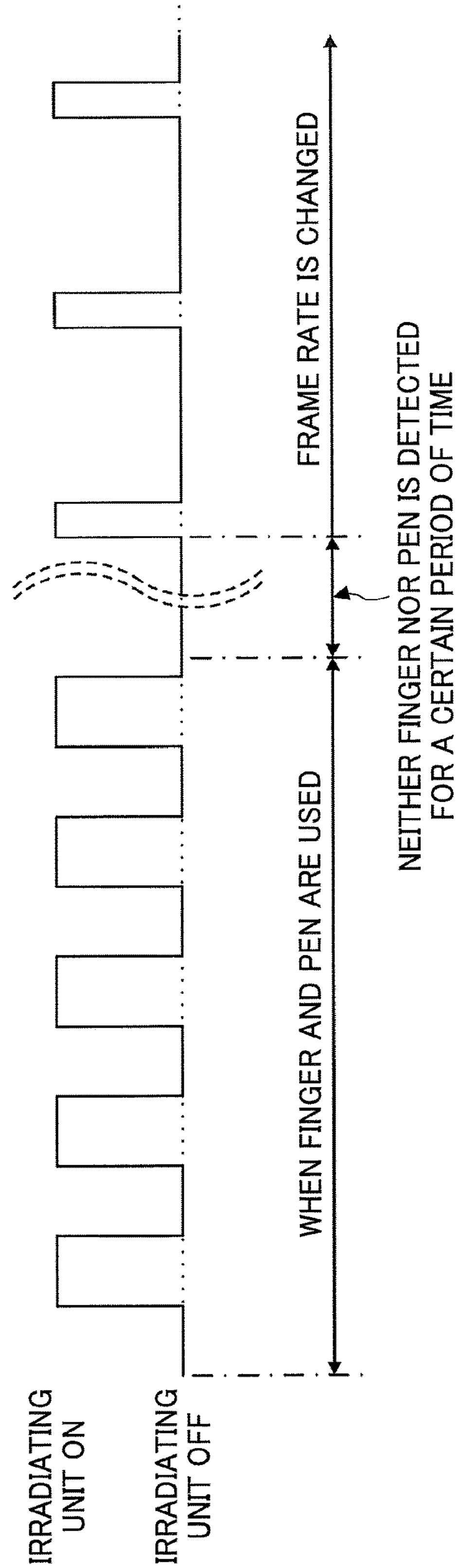
FIG. 25 is a view of one method for reducing energy consumption, when the system is not being used.

By reducing the frame rate, as illustrated in FIG. 25, the control process of repeating the lighting on and off at certain time intervals in the normal operation can be changed so that the lighting period is set shorter than the non-lighting period. When the frame rate is 120 fps in the normal operation, the frame rate can be reduced to, for example, 10 fps. Such a control process is enabled by the controller 73 changing the frame rate of the imaging unit 72, after the medium identifying unit 74 has not detected any of the finger, the light-emitting pen, or the phosphor pen for a certain period of time.

Figure 26:
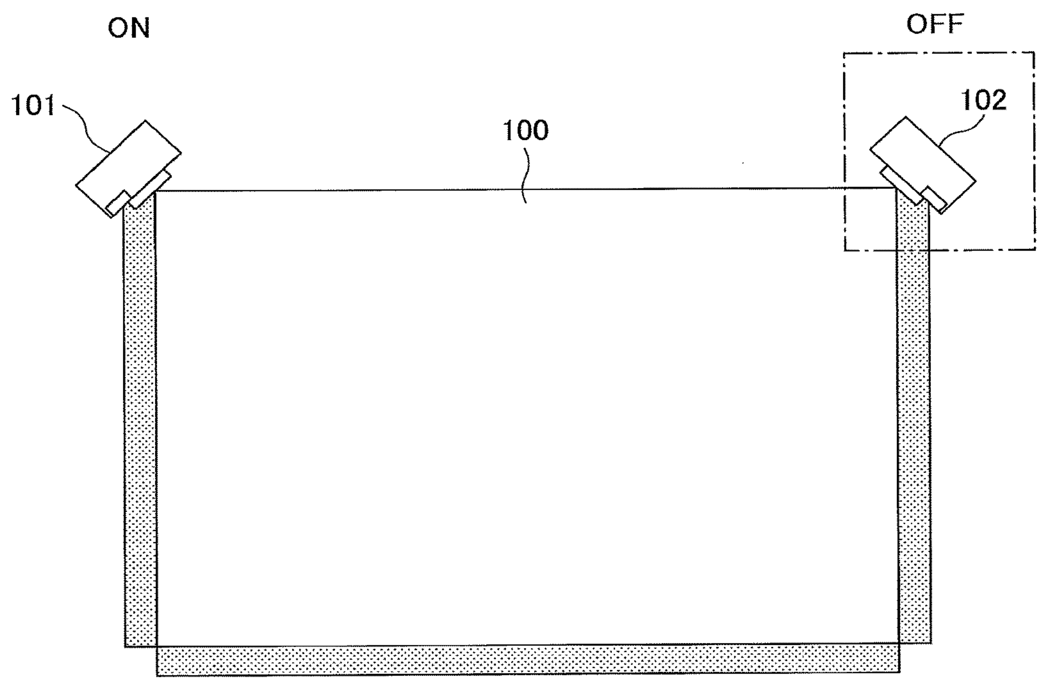
FIG. 26 is a view of another method for reducing energy consumption, when the system is not being used.

As another method for reducing the energy consumption when the information display system is not used, at least one of the plurality of cameras is kept on working, and the other cameras can be powered off. As illustrated in FIG. 26, in a system including two cameras 101 and 102 arranged at two corners of a screen 100, for example, the camera 101 can be kept on working in a normal operation state, and the camera 102 can be powered off. The case where two cameras are included has been described, but three or four cameras may be provided. One of the three or four cameras can be kept on working and the remaining two or three cameras can be powered off.

The camera 101 is normally operating and the detection of a finger or any similar thing is enabled. However, only one camera 101 is working. In this situation, the position of the finger or any similar thing cannot be detected. When the camera 101 in a normal operation detects the finger or any similar thing, the camera 102 that has been powered off is now powered on to return to the normal operation.

Such a control process is enabled by the controller 73 powering off the imaging unit 72, after the medium identifying unit 74 has not detected any of the finger, the light-emitting pen, or the phosphor pen for a certain period of time. The control process of returning to the normal operation is enabled by the controller 73 powering on the imaging unit 72, after the medium identifying unit 74 detects any one of the finger, the light-emitting pen, and the phosphor pen.

The example has been given with respect to the case where, except for one camera, all the remaining cameras are powered off. However, in a system including at least three cameras are included, at least two cameras normally operate and the remaining camera can be powered off. At least two cameras normally operating are capable of detecting a finger or any similar thing, and are capable of detecting the position of the finger or any similar thing. Therefore, when the finger or any similar thing is detected, the position detection of the finger or any similar thing may start.

Figure 27:
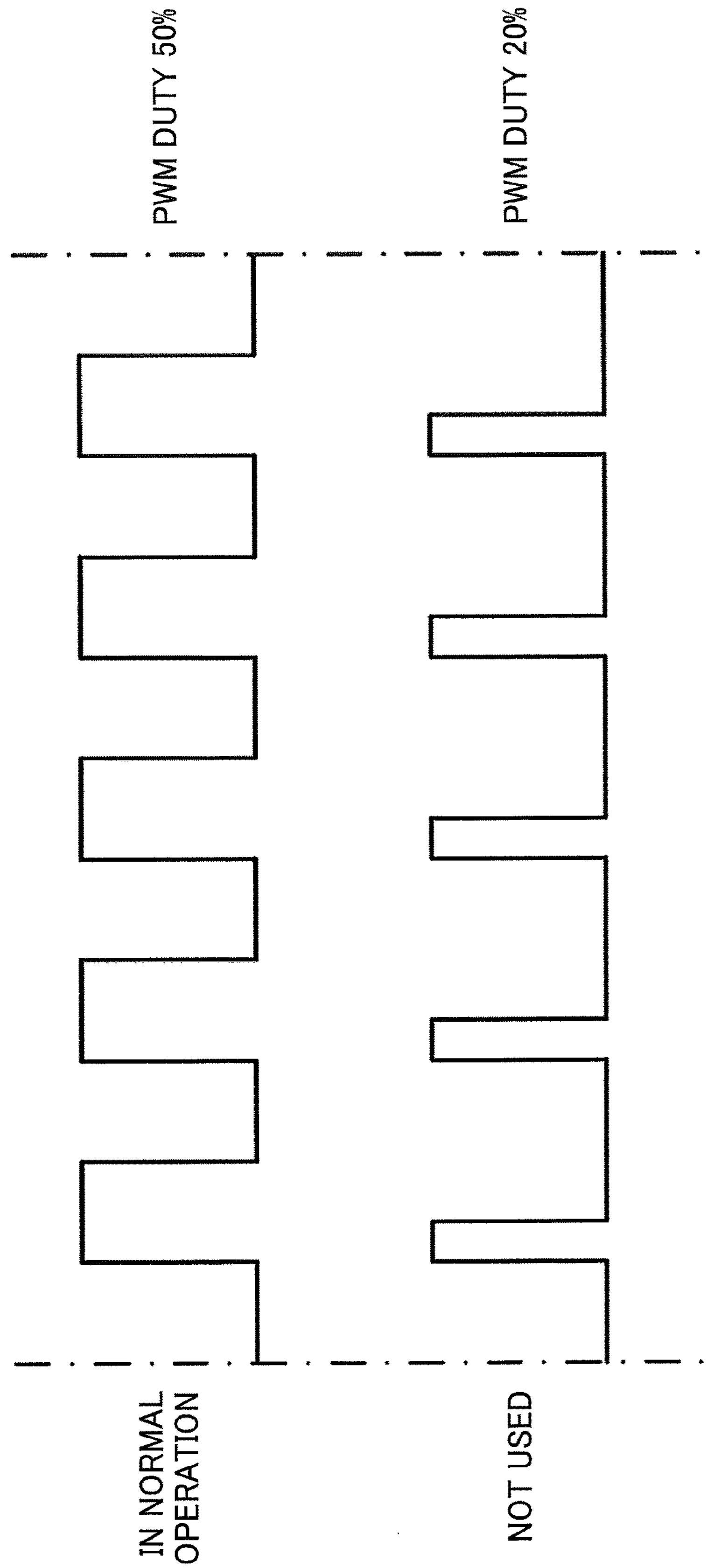
FIG. 27 is a view of yet another method for reducing energy consumption, when the system is not being used.

As yet another method for reducing the energy consumption when the information display system is not used, the duty ratio of a Pulse Width Modulation (PWM) of an LED serving as the irradiating unit 71 can be reduced. PWM is used as a control signal for modulating the LED, and changes only the width of a pulse signal with the frequency being kept constant. The duty ratio is a ratio of a period in which a certain state continues with respect to a certain period. Here, the duty ratio is a ratio of the lighting period with respect to one cycle. In FIG. 27, in a normal operation, the lighting period and the non-lighting period are repeated at certain time intervals. The PWM duty ratio is 50%. However, when the system is not used (e.g., in a waiting state), for example, the PWM duty ratio can be set to 20%, the lighting period can be set to two-fifths as long as the normal operation, and the non-lighting period can be set to 2.5 times as long as the normal operation.

With regard to the PWM duty ratio that is reduced in a waiting state, the PWM duty ratio can be set to a level by which a finger can be detected and then can be returned from the waiting state, although such a level may affect the process of detecting the position of the finger in a normal operation. Heretofore, three methods for reducing the energy consumption when the system is not used have been described. The three methods may be individually used, but may be used in combination.

Such a control process is enabled by the controller 73 performing the PWN control process to change the pulse width of a control signal to be input into the irradiating unit 71, after the medium identifying unit 74 has not detected any of the finger, the light-emitting pen, or the phosphor pen for a certain period of time.

Figure 28:
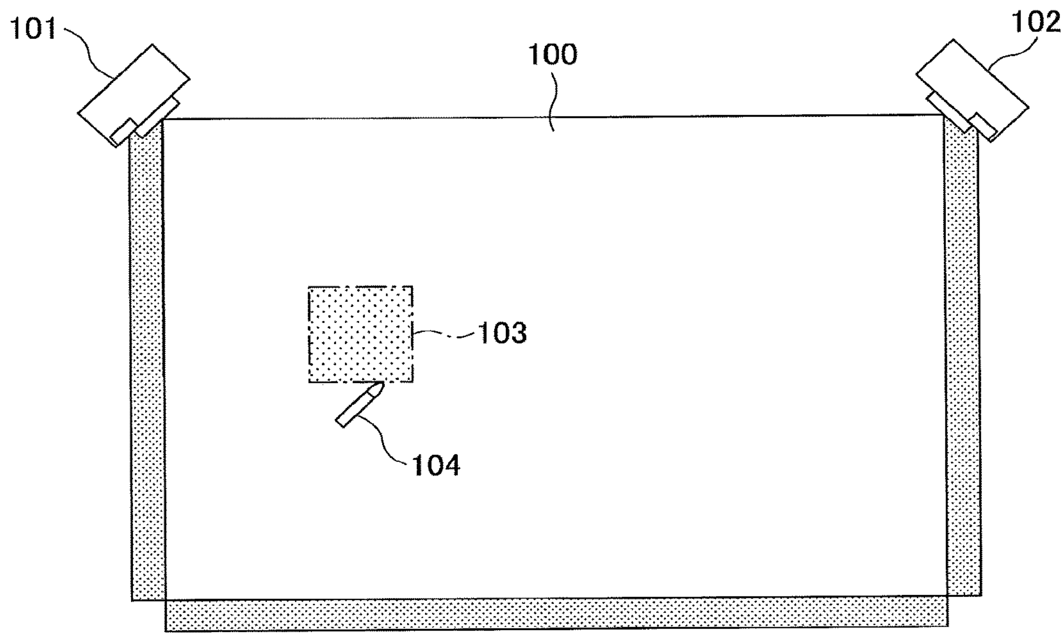
FIG. 28 is a view for describing a function of a tracking performance of tracking the electronic pen.

The information display system may include a function of reducing the energy consumption, and may also include a function of enhancing the tracking performance of tracking the electronic pen (e.g., light-emitting pen) at a certain threshold or higher. With regard to the threshold, an example can be given of the moved amount of an electronic pen 104 in a given region 103 for a certain period of time. The given region 103 may be a rectangular region 103 illustrated in FIG. 28. The moved amount may be calculated by the calculator in accordance with the position that has been detected by the position detector 75. In order to enhance the flowing capability, whether details are written with the electronic pen 104 can be determined. For making such a determination, a determining unit may be provided separately to determine whether the moved amount that has been calculated by the calculator is equal to or higher than the threshold.

When the details are written, in order to enhance the tracking performance of tracking the electronic pen 104, the control process of increasing the frame rates of the cameras 101 and 102 is performed. When the frame rates are increased, more images are acquired in the unit time, and thus more accurate position detection is achievable. Such a control process is enabled by the controller 73 changing the frame rate of the imaging unit 72.

Figure 29:
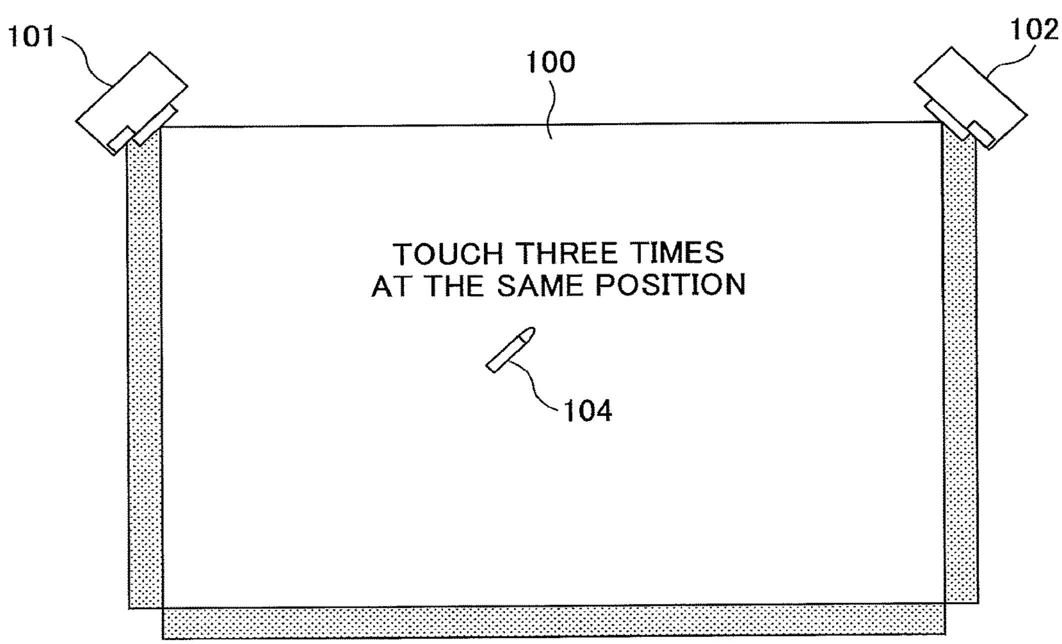
FIG. 29 is a view for describing a function of setting a detection mode.

In the information display system, in addition to the above-described functions, a function of securing a detection mode can be included. The detection mode includes an electronic pen detection mode for detecting an electronic pen, and a finger detection mode for detecting a finger. In setting the electronic pen detection mode, as illustrated in FIG. 29, the electronic pen detection mode can be set by touching the same position on the screen 100 three times, for example. This is merely an example. The same position may be touched with the electronic pen 104 twice or four or more times. Any other method for setting the electronic pen detection mode is applicable.

In FIG. 29, the same position is touched three times, but it is difficult to touch the completely same position several times consecutively. Hence, when positions in a given range are touched three times consecutively, the mode can be set. To differentiate from drawing a dot or a line, the given range may be, for example, a narrow range that falls within a one-centimeter radius with a position first touched as the center.

This function is enabled by the medium identifying unit 74 identifying the electronic pen 104 a given number of times consecutively, here, three times, and by the position detector 75 detecting the electronic pen 104 within a given range three times consecutively. Then, the controller 73 sets the mode and causes the irradiating unit 71 to irradiate the light continuously or stop the irradiation.

By including the above-described additional function, the energy consumption in a waiting state is reduced, and the tracking performance of tracking the electronic pen or any similar thing is improved. By setting the mode, while one user is adding information, the other users are prohibited from adding information. This configuration prohibits the other users from adding information, while the other users at remote locations are also using the information display system. Therefore, convenience is improved.

In the above-described description, the recognition rate is changed depending on the energy consumption mode. However, the method for reducing the energy consumption is not limited to the above-described examples. The frame rates of the cameras 101 and 102 may be changed. Such a change in frame rate is a trade-off with the tracking performance of tracking the finger, but the energy consumption of a whiteboard in an operating state is reduced.

Some embodiments of the present invention have been described with respect to an information display device, an information display system, and a recording medium. However, the present invention is not limited to these embodiments, but various variations and modifications may be made without departing from the scope of the present invention.

Therefore, it is possible to provide a method performed by an information display device or an information display system, a recording medium in which the above-described programs are recorded, and an external device that supplies the above-described programs.

What is claimed is:

1. An information display device displaying information, the information display device comprising:
- a display to display the information;
- a light source configured to irradiate the display with light;
- at least one camera configured to capture an image on the display; and
- a processing circuitry configured to
  - cause the light source to alternately switch irradiation and non-irradiation,
  - identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein when the processing circuitry identifies only one of the first input medium and the second input medium, the processing circuitry is further configured to change a timing of switching the irradiation and the non-irradiation depending on the first input medium and the second input medium, whichever has been identified.

2. The information display device according to claim 1, wherein the processing circuitry is further configured to create the additional information in accordance with the detected positions; and combine the created additional information with the information being displayed on the display, wherein the display displays the combined information.

3. The information display device according to claim 1, wherein the processing circuitry is further configured to change a number of images captured by the at least one camera in a unit time, after the processing circuitry has identified neither the first input medium nor the second input medium for a certain period of time.

4. An information display device displaying information, the information display device comprising:

a display to display the information;

a light source configured to irradiate the display with light;

at least one camera configured to capture an image on the display; and processing circuitry configured to cause the light source to alternately switch irradiation and non-irradiation, identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein the processing circuitry is further configured to calculate moved amounts of the first input medium and the second input medium for a given period of time, using the detected positions, and change a timing of switching the irradiation and the non-irradiation depending on the calculated moved amounts of the first input medium and the second input medium.

5. The information display device according to claim 4, wherein the processing circuitry is further configured to determine whether a moved amount of the first input medium in a given area for a certain period of time is equal to or higher than a threshold.

6. An information display device displaying information, the information display device comprising:

a display to display the information;

a light source configured to irradiate the display with light;

at least one camera configured to capture an image on the display; and processing circuitry configured to cause the light source to alternately switch irradiation and non-irradiation, identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein the first input medium includes a tip portion having a given thickness to be touched on the display, and wherein the processing circuitry is further configured to change a timing of switching the irradiation and the non-irradiation depending on the given thickness of the tip portion included in the first input medium.

7. An information display device displaying information, the information display device comprising:

a display to display the information;

a light source configured to irradiate the display with light;

at least one camera configured to capture an image on the display; and processing circuitry configured to cause the light source to alternately switch irradiation and non-irradiation, identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein the processing circuitry is further configured to change a timing of switching the irradiation and the non-irradiation, or change a number of images captured by the at least one camera in a unit time, depending on an energy consumption mode that is set.

8. An information display device displaying information, the information display device comprising:

a display to display the information;

a light source configured to irradiate the display with light;

at least one camera configured to capture an image on the display; and processing circuitry configured to cause the light source to alternately switch irradiation and non-irradiation, identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein the first input medium includes a light emitter configured to absorb light in a given wavelength, and to emit the light, the light source irradiates the light in the given wavelength, the light source is configured to irradiate a plurality of the first input media with the light in different wavelengths, the light emitters in the plurality of the first input media absorbing the light in the different wavelengths and emitting the light, the processing circuitry is further configured to cause the light source to switch to irradiate the light in successive ones of the different wavelengths in the irradiation, and the processing circuitry is further configured to identify each of the plurality of the first input media in accordance with the images successively captured by the at least one camera.

9. The information display device according to claim 8, wherein the processing circuitry is further configured to change a timing of switching to irradiate the light in the different wavelengths in the irradiation depending on the first input medium that has been identified by the processing circuitry.

10. An information display device displaying information, the information display device comprising:

a display to display the information;

a light source configured to irradiate the display with light;

at least one camera configured to capture an image on the display; and processing circuitry configured to cause the light source to alternately switch irradiation and non-irradiation, identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein the first input medium includes a light emitter configured to absorb light in a given wavelength, and to emit the light, the light source irradiates the light in the given wavelength, and the processing circuitry is further configured to cause the light source to switch to irradiate the light in successive ones of a plurality of different wavelengths, and to switch the irradiation and the non-irradiation.

11. The information display device according to claim 10, wherein the processing circuitry is further configured to cause the light source to switch to irradiate the light in successive ones of the plurality of different wavelengths in synchronization with a turn-off timing of a third input medium that repeats turning on and off at a given timing.

12. An information display device displaying information, the information display device comprising:

a display to display the information;

a light source configured to irradiate the display with light;

at least one camera configured to capture an image on the display; and processing circuitry configured to cause the light source to alternately switch irradiation and non-irradiation, identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein except for at least one of the at least one camera, the processing circuitry is configured to power off the at least one camera, after the processing circuitry has identified neither the first input medium nor the second input medium for a certain period of time.

13. An information display device displaying information, the information display device comprising:

a display to display the information;

a light source configured to irradiate the display with light;

at least one camera configured to capture an image on the display; and processing circuitry configured to cause the light source to alternately switch irradiation and non-irradiation, identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein the processing circuitry is further configured to change a pulse width of a control signal to be input into the light source, after the processing circuitry has identified neither the first input medium nor the second input medium for a certain period of time.

14. An information display device displaying information, the information display device comprising:

a display to display the information;

a light source configured to irradiate the display with light;

at least one camera configured to capture an image on the display; and processing circuitry configured to cause the light source to alternately switch irradiation and non-irradiation, identify a first input medium that emits light and a second input medium that does not emit the light in accordance with images successively captured by the at least one camera, by causing the light source to alternately switch the irradiation and the non-irradiation, the first input medium and the second input medium being used for inputting additional information to be added to the information, and detect positions of the first input medium and the second input medium on the display in accordance with the images successively captured by the at least one camera, the first input medium and the second input medium having been identified by the processing circuitry, wherein the processing circuitry is further configured to cause the light source to irradiate the light continuously or to stop irradiation of the light, after the processing circuitry has identified the first input medium a given number of times consecutively and has detected a position of the first input medium within a given range the given number of times consecutively.

* * * * *